United States Patent
Dixon

(10) Patent No.: US 9,895,864 B2
(45) Date of Patent: Feb. 20, 2018

(54) LAMINATED GLAZING

(71) Applicant: PILKINGTON GROUP LIMITED, Nr. Ormskirk, Lancashire (GB)

(72) Inventor: Jonathan Barclay Dixon, Ormskirk (GB)

(73) Assignee: PILKINGTON GROUP LIMITED, Nr. Ormskirk, Lancashire (GB)

( * ) Notice: Subject to any disclaimer, the term of this patent is extended or adjusted under 35 U.S.C. 154(b) by 5 days.

(21) Appl. No.: 14/786,863

(22) PCT Filed: Apr. 25, 2014

(86) PCT No.: PCT/GB2014/051296
§ 371 (c)(1),
(2) Date: Oct. 23, 2015

(87) PCT Pub. No.: WO2014/174308
PCT Pub. Date: Oct. 30, 2014

(65) Prior Publication Data
US 2016/0075111 A1    Mar. 17, 2016

(30) Foreign Application Priority Data

Apr. 25, 2013 (GB) .................................. 1307495.0

(51) Int. Cl.
*B32B 3/10* (2006.01)
*B32B 17/10* (2006.01)
(Continued)

(52) U.S. Cl.
CPC .......... *B32B 17/10174* (2013.01); *B32B 7/12* (2013.01); *B32B 17/10036* (2013.01);
(Continued)

(58) Field of Classification Search
None
See application file for complete search history.

(56) References Cited

U.S. PATENT DOCUMENTS 5,932,329 A    8/1999  Frost et al.
6,455,141 B1 * 9/2002  Woodard ................ B32B 17/10
                                                      428/214
(Continued)

FOREIGN PATENT DOCUMENTS

CN   101454154 A    6/2009
EP   0 997 266 A1    5/2000
(Continued)

OTHER PUBLICATIONS

International Search Report (PCT/ISA/210) dated Aug. 1, 2014, by the European Patent Office as the International Searching Authority for International Application No. PCT/GB2014/051296.
(Continued)

*Primary Examiner* — Christopher Polley
(74) *Attorney, Agent, or Firm* — Buchanan Ingersoll & Rooney PC

(57) ABSTRACT

A laminated glazing is described comprising a first pane of glazing material having a first major surface and an opposing second major surface, there being an obscuration band on the second major surface extending around a portion of the periphery of the first pane such that the second major surface is not smooth. A first adhesive layer having a thickness of between 6 μm and 100 μm contacts a portion of the second major surface of the first pane of glazing material and a portion of the obscuration band. The laminated glazing also has a carrier ply carrying an infra red reflecting coating wherein the first adhesive layer is between the first pane of glazing material and the carrier ply.

17 Claims, 10 Drawing Sheets

(51) Int. Cl.
    *B32B 7/12*     (2006.01)
    *B32B 37/12*     (2006.01)

(52) U.S. Cl.
    CPC .... *B32B 17/1077* (2013.01); *B32B 17/10348* (2013.01); *B32B 17/10532* (2013.01); *B32B 17/10761* (2013.01); *B32B 37/12* (2013.01); *B32B 2307/202* (2013.01); *B32B 2605/006* (2013.01); *B32B 2605/08* (2013.01)

(56) References Cited

U.S. PATENT DOCUMENTS

| | | | | |
|---|---|---|---|---|
| 6,495,261 | B1 * | 12/2002 | Gagliardi | B32B 17/10018 296/190.1 |
| 2004/0124665 | A1 * | 7/2004 | Kraenzler | B32B 17/10036 296/146.15 |
| 2005/0227061 | A1 | 10/2005 | Slovak et al. | |
| 2009/0176101 | A1 | 7/2009 | Greenall et al. | |
| 2009/0219468 | A1 | 9/2009 | Barton et al. | |
| 2010/0285280 | A1 | 11/2010 | Yonekura et al. | |

FOREIGN PATENT DOCUMENTS

| | | |
|---|---|---|
| EP | 2 218 698 A1 | 8/2010 |
| GB | 2 482 513 A | 2/2012 |
| WO | WO 97/03763 A1 | 2/1997 |
| WO | WO 2005/102688 A2 | 11/2005 |
| WO | WO 2007/122426 A1 | 11/2007 |
| WO | WO 2007/122428 A1 | 11/2007 |

OTHER PUBLICATIONS

Office Action (Notification of the First Office Action) dated Nov. 4, 2016, by the Patent Office in corresponding Chinese Patent Application No. 201480031402.6, and an English translation of the Office Action. (16 pgs).

\* cited by examiner

LAMINATED GLAZING

The present invention relates to a laminated glazing comprising an infra red reflecting coating on a plastic ply.

Films are known having an electrically actuated layer where the optical properties of the electrically actuated layer are changeable upon applying an electric field across the layer. Examples are liquid crystal display (LCD) films and suspended particle device (SPD) films.

A suspended particle device (SPD) film, such as that described in WO2005/102688A2 is a film comprising a plurality of particles suspended within a liquid suspension medium, which are held within a polymer medium. The film is switchable between an opaque state (when no is voltage applied), and a transparent state (when voltage is applied). The degree of relative alignment between the particles is determined by the applied AC voltage, such that an SPD-based device exhibits a variable optical transmission when a variable voltage is applied. It is known to produce a laminated glass having an SPD film in between two plies of glass and various constructions have been proposed.

In one laminated glazing construction the SPD film is placed between two plies of bonding interlayer, the two plies of bonding interlayer being in between two plies of glazing material. Another option is to place the SPD film in a cut out region in a first ply of interlayer material to "frame" the SPD film. The framed SPD film can then be placed between two plies of interlayer material, and laminated between two plies of glazing material. This construction is described in WO2007/122428A1.

It is known that SPD films are sensitive to heat and it has been proposed to reduce the amount of heat incident on an SPD film in a laminated glazing by incorporating an infra red (IR) reflecting film (often referred to as an infra red reflective film) in between the SPD film and the heat source, i.e. the sun. The IR reflecting film may be an IR reflecting coating deposited on one of the surfaces of the outer facing pane of glazing material of the laminate, or may be an IR reflecting coating carried on a ply in between the outer facing pane of glazing material of the laminate and the SPD film. The IR reflecting film may be carried on an interlayer ply or an additional plastic ply or film.

IR reflecting films comprising an IR reflecting coating on a plastic carrier ply are known in the art, and typically comprise a polyethylene terephthalate (PET) film having a vacuum deposited infra red reflecting coating thereon. A laminated glazing comprising an SPD film and an IR reflecting film is described in WO2007/122426A1.

There are however problems when incorporating an IR reflecting coating deposited on a plastic carrier ply into a laminated glazing and it is known that the incorporation of an IR reflecting coated carried on a plastic carrier ply into a laminated glazing can cause a problem of optical distortion, particularly in reflection. In the art this optical distortion has been referred to as "orange peel" or "apple sauce". In WO97/03763A1 the problem of optical distortion is described as being due to commercial sheet polyvinyl butyral (PVB) being textured for de-airing during lamination. The texture from the PVB will emboss onto the PET (the PET sheet being a carrier for an IR reflecting coating). Subsequently, the reflective image from the vapour deposited coating (on the PET) is not planar and is objectionable.

When incorporating an SPD film into a laminated glazing including a PET ply having an IR reflecting coating thereon, the problem of optical distortion is increased when the SPD film is in the darkened state because the optical distortion is more visually apparent.

It has been proposed to overcome the problem of optical distortion from laminated glass structures which include an IR reflecting coated plastic intermediate layer by using a thin adhesive layer instead of the conventional thickness of such bonding interlayer i.e. 0.38 mm-0.76 mm. In WO97/03763A1 it is taught that for glass sheets having smooth surfaces the aforementioned problem of optical distortion can be eliminated by using a layer of adhesive having a thickness below 127 μm, in particular having a thickness of between 13 μm and 76 μm. The examples in WO97/03763A1 are of flat glass and not curved glass.

U.S. Pat. No. 5,932,329 describes a laminated glass pane comprising two glass sheets and a transparent support film having an infra red reflecting surface coating connected to the two glass sheets by adhesive layers, the first adhesive layer having a thickness of at most 50 μm and the second adhesive layer has a thickness of 0.76 mm. There is no disclosure in U.S. Pat. No. 5,932,329 of the glass sheets having anything on any of the surfaces thereof that would lead a person skilled in the art to understand that the glass sheets had anything other than a smooth surface.

However when manufacturing a commercial laminated glazing, in particular for use in a vehicle, it is conventional to include an obscuration band of opaque ceramic ink extending around the entire periphery of at least one of the major surfaces of the glazing. For example when the laminated glazing is a vehicle windshield it is known in the art that the obscuration band serves to improve the appearance of the windshield by masking the interface between the glazing and the vehicle and also to shield adhesive fixing the windshield in the aperture in the vehicle bodywork from ultra violet which might damage the integrity thereof over time. The obscuration band also serves to hide electrical connectors or the like so that such electrical connectors are not observable when the laminated glazing is in use. Commonly the obscuration band comprises a solid coloured band extending around the periphery of the panel and a fade out band extending inwardly from the inner edge of the solid coloured band where the obscuration is applied in a decorative pattern with anything from 1% to 99% of the surface area of the glass being obscured. The fade out band avoids the appearance of an abrupt edge and the gradual decrease in opacity is more visually acceptable.

When manufacturing a laminated glazing comprising two panes of glass joined by a sheet or ply of PVB interlayer material, the obscuration band is applied (by printing, painting etc) to the appropriate glass surface when the glass pane is cold (typically at ambient temperature) and is fired onto that surface by raising the temperature of the glass pane such that the obscuration band forms an intimate bond to the glass surface. The thickness of the obscuration band when fired onto the glass surface is typically between 5 μm and 50 μm.

The consequence of having an obscuration band is that the major surface of the pane of glass is no longer smooth across the entire surface of the pane i.e. in the region of the obscuration band, and in particular in the region of the fade out band.

In order to apply the teaching in WO97/03763A1, it would be possible to have the obscuration band on both exposed surfaces of the outer panes of the laminated glazing such that surfaces of the outermost panes facing the laminating layers are smooth. This is illustrated in FIG. 1.

FIG. 1 shows (not to scale) a laminated glazing 100 having a first glass pane 102 joined to a second glass pane 104 via an interlayer structure.

With reference to the orientation of the glazing 100 shown in FIG. 1, the first glass pane 102 has an upper surface and a lower surface. On the upper surface these is an obscuration band 103 and a fade out band 105. The obscuration band and fade out band extend around the periphery of the upper surface of the first glass pane 102.

A first adhesive layer 106 is in contact with the lower surface of the first glass pane 102, which is a smooth surface because there is no obscuration band or fade out band thereon. This first adhesive layer 106 has a thickness between 6 µm and 100 µm. In contact with the first adhesive layer 106 is an IR reflecting coating 107 that is being carried on a plastic ply 108. The plastic ply 108 is 100 µm thick. The first adhesive layer 106, the IR reflecting coating 107 and the plastic ply 108 form a composite ply 101 i.e. prior to being incorporated into the laminated glazing the first adhesive layer 106, the IR reflecting coating 107 and the plastic ply 108 are joined together as composite ply 101. It is possible for the positions of the plastic ply 108 and the IR reflecting coating 107 to be reversed. The composite ply 101 may be made in accordance with WO97/03763A1.

In contact with the plastic ply 108 is a second adhesive layer 109 that is between 0.38 mm and 0.76 mm thick. In contact with the second adhesive layer is the upper surface of second glass pane 104. On the lower surface of the second glass pane is an obscuration band 103' and a fade out band 105'. The first glass pane 102 is joined to the second glass pane 104 via an interlayer structure consisting of the first adhesive layer 106, the IR reflecting coating 107, the plastic ply 108, and the second adhesive layer 109.

Even though the laminated glazing comprises an obscuration band and a fade out band, it is possible to apply the teaching of WO97/03763A1 using the construction shown in FIG. 1.

Another alternative way to practice the teaching of WO97/03763A1 would be to ensure the thin adhesive layer only extended between the obscuration band with the edge of the thin adhesive layer being offset from the periphery of the obscuration band such that there was no contact between the thin adhesive layer and the obscuration band or fade out band. This is illustrated in FIGS. 2 and 3.

FIG. 2 shows (not to scale) a laminated glazing 110 having a first glass pane 112 joined to a second glass pane 114 via an interlayer structure.

With reference to the orientation of the glazing 110 shown in FIG. 2, the first glass pane 112 has an upper surface and a lower surface. On the lower surface of the first glass pane there is an obscuration band 113 and a fade out band 115. The obscuration band and fade out band extend around the periphery of the lower surface of the first glass pane 112. Consequently the entire lower surface of the first glass pane 112 is not smooth.

A first adhesive layer 116 is in contact with the lower surface of the first glass pane 112 only in between the edges of the fade out band 115 such that the first adhesive layer 116 does not contact the fade out band 115 i.e. there is a space between the edge of the fade out band and the peripheral edge of the first adhesive layer 116.

The first adhesive layer 116 has a thickness between 6 µm and 100 µm. In contact with the first adhesive layer is an IR reflecting coating 117 that is being carried on a plastic ply 118. The plastic ply 118 is 100 µm thick. The first adhesive layer 116, the IR reflecting coating 117 and the plastic ply 118 are coextensive with each other. The first adhesive layer 116, the IR reflecting coating 117 and the plastic ply 118 are a composite ply 111 (the reference numeral 111 is not indicated on the figure for clarity) i.e. prior to being incorporated into the laminated glazing the first adhesive layer 116, the IR reflecting coating 117 and the plastic ply 118 are joined together as composite ply 111. It is possible for the positions of the plastic ply 118 and the IR reflecting coating 117 to be reversed. The composite ply 111 may be made in accordance with WO97/03763A1.

In contact with the plastic ply 118 is a second adhesive layer 119. Since the composite ply only extends between, and is slightly offset from, the edges of the fade out band the second adhesive layer 119 also contacts the fade out band 115 and the obscuration band 113. The second adhesive layer 119 also contacts a portion of the lower surface of the first glass pane 112 in the region of the fade out band that is not covered with ink. The second adhesive layer 119 has a thickness between 0.38 mm and 0.76 mm.

Also in contact with the second adhesive layer 119 is the upper surface of a second glass pane 114. On the lower surface of the second glass pane is an obscuration band 113' and a fade out band 115'. The first glass pane 112 is joined to the second glass pane 114 via an interlayer structure consisting of the first adhesive layer 116, the IR reflecting coating 117, the plastic ply 118, and the second adhesive layer 119.

Even though the laminated glazing 110 comprises an obscuration band and a fade out band, it is possible to apply the teaching of WO97/03763A1 using the construction shown in FIG. 2.

FIG. 3 shows (not to scale) a laminated glazing 120 having a first glass pane 122 joined to a second glass pane 124 via an interlayer structure.

With reference to the orientation of the glazing 120 shown in FIG. 3, the first glass pane 122 has an upper surface and a lower surface. On the lower surface there is an obscuration band 123 that extends around the periphery of the lower surface of the first glass pane 122. Consequently the entire lower surface of the first glass pane is not smooth. A first adhesive layer 126 is in contact with the lower surface of the first glass pane 122 only in between the edges of the obscuration out band 123 such that the first adhesive layer does not contact the obscuration band 123. The first adhesive layer 126 has a thickness between 6 µm and 100 µm.

In contact with the first adhesive layer 126 is an IR reflecting coating 127 that is being carried on a plastic ply 128. The plastic ply 128 is 100 µm thick. The first adhesive layer 126, the IR reflecting coating 127 and the plastic ply 128 are coextensive with each other. The first adhesive layer 126, the IR reflecting coating 127 and the plastic ply 128 are a composite ply 121 (reference numeral 121 is not indicated on the figure for clarity) i.e. prior to being incorporated into the laminated glazing the first adhesive layer 126, the IR reflecting coating 127 and the plastic ply 128 are joined together as a composite ply 121 (which is the same as composite ply 111). It is possible for the positions of the plastic ply 128 and the IR reflecting coating 127 to be reversed. The composite ply 121 may be made in accordance with WO97/03763A1.

In contact with the plastic ply 128 is a second adhesive layer 129. Since the composite ply 121 only extends between the edges of the obscuration band and does not contact the obscuration band 123, the second adhesive layer 129 also contacts the obscuration band 123. The second adhesive layer 129 has a thickness between 0.38 mm and 0.76 mm.

In contact with the lower surface of the second adhesive layer 129 is an SPD film 131. The SPD film 131 is sandwiched between the second adhesive layer 129 and a third adhesive layer 130 i.e. the upper surface of the third adhesive layer 130 is in contact with the lower surface of the SPD film 131. The third adhesive layer has a thickness between 0.38 mm and 0.76 mm.

The SPD film 131 is sized to be coextensive with the second adhesive layer 129 and third adhesive layer 130. Consequently the periphery of the SPD film is beneath the obscuration band 123 which provides protection from sunlight. The edge of the SPD film may be slightly inboard of the peripheral edge of the laminated glazing with the edge of the SPD film being obscured by the obscuration band when the laminated glazing is viewed normal to the upper surface of the first glass pane 122.

The lower surface of the third adhesive layer 130 is in contact with the upper surface of a second glass pane 124. The lower surface of the second glass pane has an obscuration band 123' thereon extending around the periphery thereof. The first glass pane 122 is joined to the second glass pane 124 via an interlayer structure consisting of the first adhesive layer 126, the IR reflecting coating 127, the plastic ply 128, the second adhesive layer 129, the SPD film 131 and the third adhesive layer 130.

Even though the laminated glazing comprises an obscuration band, it is possible to apply the teaching of WO97/03763A1 using the construction shown in FIG. 3.

Surprisingly the present inventor has found that it possible to produce a laminated glazing having a thin layer of adhesive on a surface of a pane of glazing material that is not smooth.

Accordingly from a first aspect the present invention provides a laminated glazing comprising a first pane of glazing material having a first major surface and an opposing second major surface, there being an obscuration band on the second major surface extending around a portion of the periphery of the first pane such that the second major surface is not smooth, a first adhesive layer having a thickness of between 6 µm and 100 µm, and a carrier ply carrying an infra red reflecting coating, wherein the first adhesive layer is between the first pane of glazing material and the carrier ply and the first adhesive layer contacts a portion of the second major surface and a portion of the obscuration band.

Surprisingly even though the obscuration band is raised with respect to the second major surface of the first pane of glazing material such that the entire second major surface of the first pane of glazing material is no longer smooth, the thin adhesive layer is still able to adhere thereto to form a laminate of acceptable quality, in particular in the region of the obscuration band.

It is to be understood (as is commonly the case) that by the laminated glazing comprising a first pane of glazing material and a first adhesive layer, the laminated glazing comprises at least one pane of glazing material and at least one adhesive layer.

Preferably the first adhesive layer has a thickness between 10 µm and 100 µm, more preferably between 13 µm and 76 µm.

Preferably the thickness of the obscuration band is between 1 µm and 150 µm.

Preferably the thickness of the obscuration band is between 1 µm and 100 µm, more preferably between 1 µm and 50 µm, even more preferably between 1 µm and 25 µm, most preferably between 5 µm and 25 µm.

Preferably the thickness of the obscuration band is between 5 µm and 100 µm, more preferably between 5 µm and 50 µm.

In some embodiments preferably the obscuration band comprises a fade out band and the first adhesive layer contacts at least a portion of the fade out band. Over the fade out band the surface presented to the first adhesive layer is not smooth.

Preferably the fade out band is a pattern such that between 1% and 99% of the surface area of at least a portion of the second major surface of the first pane of glazing material is obscured by the fade out band.

Preferably the fade out band comprises a plurality of disconnected optically opaque regions. Preferably the disconnected regions of the fade out band have a size distribution such that smaller sized regions are located closer towards the geometric centre of the second major surface of the first pane of glazing material.

Preferably the fade out band has a width of between 0.25 cm and 10 cm, preferably between 0.5 cm and 5 cm.

Preferably the thickness of the fade out band is between 1 µm and 150 µm

Preferably the thickness of the fade out band is between 1 µm and 100 µm, more preferably between 1 µm and 50 µm, even more preferably between 1 µm and 25 µm, most preferably between 5 µm and 25 µm.

Preferably the thickness of the fade out band is between 5 µm and 100 µm, more preferably between 5 µm and 50 µm.

It has been found that an acceptable laminated glazing is still able to be produced when the obscuration band comprises a fade out band. Preferably the disconnected regions of the fade out band have a size distribution such that smaller sized regions are located closer towards the centre of the second major surface of the first ply of glazing material.

In a preferred embodiment the laminated glazing comprises a second pane of glazing material and a second adhesive layer, wherein the second adhesive interlayer is in contact with the second pane of glazing material and the infra red reflecting coating is between the first adhesive layer and the second adhesive layer. For the avoidance of doubt, there may be other layers of material in between the second adhesive layer and the infra red reflecting coating.

Suitably the second adhesive layer is thicker than the first adhesive layer.

Preferably the second adhesive layer has a thickness between 0.1 mm and 2 mm, preferably between 0.1 mm and 1 mm, more preferably between 0.2 mm and 0.8 mm.

The second pane of glazing material has a first major surface and an opposing second major surface. Preferably there is an obscuration band on the first and/or second major surface extending around a portion of the periphery of the second pane. Preferably the obscuration band on the second pane of glazing material is in contact with the second adhesive layer.

Preferably the obscuration band on the second pane of glazing material comprises a fade out band.

In another preferred embodiment the laminated glazing comprises a second pane of glazing material, a second adhesive layer and a film comprising an electrically actuated layer, wherein the film is either (i) between the second adhesive layer and the carrier ply or (ii) between the second adhesive layer and the second pane of glazing material. In embodiment (ii) the film may be attached to the second pane of glazing material by the second adhesive layer extending beyond the edges of the film, or by the laminated glazing comprising one or more additional adhesive layers between the film and second pane of glazing material.

In embodiment (ii), preferably the laminated glazing comprises one or more adhesive layers between the film and the second pane of glazing material.

In another preferred embodiment the laminated glazing comprises a second adhesive layer, a third adhesive layer, a second pane of glazing material and a film comprising an electrically actuated layer, wherein the film is located between the second adhesive layer and the third adhesive layer and the second adhesive layer contacts the second pane of glazing material. Preferably the film is located in a cut out region in a fourth adhesive layer, and the fourth adhesive layer is between the second adhesive layer and the third adhesive layer.

When the laminated glazing comprises a film comprising an electrically actuated layer, preferably the film is located in a cut out region in an adhesive layer configured as a frame, and the adhesive layer configured as a frame is between the second adhesive layer and the carrier ply.

When the laminated glazing comprises a film comprising an electrically actuated layer, preferably the electrically actuated layer has a high visible light transmission state and a low visible light transmission state.

In embodiments where there is a second adhesive layer, preferably the second adhesive layer has a thickness between 0.1 mm and 2 mm, more preferably between 0.1 mm and 1 mm, even more preferably between 0.2 mm and 0.8 mm.

In embodiments where there is a third adhesive layer, preferably the third adhesive layer has a thickness between 0.1 mm and 2 mm, more preferably between 0.1 mm and 1 mm, even more preferably between 0.2 mm and 0.8 mm.

In embodiments where there is a film comprising an electrically actuated layer, preferably at least a portion of an edge of the film is in registration with the obscuration band on the first pane of glazing material.

To protect the film comprising the electrically actuated layer from the effects of sunlight, the film is positioned between the infra red reflecting coating and the second pane of glazing material, with the first pane of glazing material configured in use to face the sun.

Preferably the film is coextensive with infra red reflecting coating.

Preferably one or more edges of the film lie within the perimeter defined by the periphery of the infra red reflecting coating.

Preferably the entire perimeter of the film lies within the perimeter defined by the periphery of the infra red reflecting coating.

Preferably the film is coextensive with carrier ply.

Suitably one or more edges of the film lie within the perimeter defined by the periphery of the carrier ply.

Suitably the entire perimeter of the film lies within the perimeter defined by the periphery of the carrier ply.

In some embodiments the visible light transmission calculated according to BS EN410 through a portion of the laminated glazing not covered with the obscuration band is at least 70%.

In some embodiments the visible light transmission calculated according to BS EN410 through a portion of the laminated glazing not covered with the obscuration band is less than 70%, preferably less than 50%, more preferably less than 10%, most preferably less than 5%.

In embodiments where the laminated glazing comprises a film comprising an electrically actuated layer, the film comprising the electrically actuated layer preferably comprises an SPD film or an LCD film.

In embodiments where the laminated glazing comprises a film comprising an electrically actuated layer, the film comprising the electrically actuated layer is preferably an SPD film or an LCD film.

Embodiments of the first aspect of the present invention have other preferable features.

Preferably the thickness of the first pane of glazing material is between 1 mm and 4 mm, more preferably between 1.6 mm and 3.1 mm, most preferably between 1.8 mm and 2.2 mm.

Preferably the laminated glazing has a convex surface and an opposite concave surface.

Preferably the laminated glazing is curved in at least one direction. Preferably the radius of curvature in the at least one direction is between 500 mm and 20000 mm, more preferably between 1000 mm and 8000 mm.

Preferably the carrier ply is a plastic ply. Preferably the plastic is polyester or polycarbonate. Preferably the polyester is polyethylene terephthalate (PET).

Preferably the carrier ply has a thickness between 0.01 mm and 0.5 mm, more preferably between 0.01 mm and 0.25 mm, most preferably between 0.01 mm and 0.1 mm.

Preferably the infra red reflecting coating includes one or more metallic layers (or metal oxide layers) and one or more dielectric layers, typically forming a multilayer stack. The multilayer stack structure may be repeated to enhance the reflectivity of the film. Amongst other similar metals, silver, gold, copper, nickel and chromium may be used as the metallic layer in a multilayer stack; indium oxide, antimony oxide or the like may be used as the metal oxide layer. Films comprising one or two layers of silver interleaved between layers of a dielectric such as an oxide of silicon, aluminium, titanium, vanadium, tin or zinc are typical multilayer stacks. Generally the one or more layers from which the infrared reflective film is formed are of the order of tens of nanometers in thickness.

As an alternative to the (metal/dielectric) based coating described above, the coating may include a plurality of non-metallic layers, such that it functions as a band filter (the band being focussed on the near infrared region of the electromagnetic spectrum).

Preferably the obscuration band extends from the periphery of the first pane of glazing material to less than 30 cm from the periphery of the first pane of glazing material, more preferably to less than 20 cm from the periphery of the first pane of glazing material.

Preferably the obscuration extends around the entire periphery of the first pane of glazing material.

Preferably the obscuration band comprises a first portion and a second portion, wherein the first portion extends closer to the geometric centre of the second major surface than the second portion.

Preferably the first pane of glazing material has a coating on a portion of a major surface thereof, such that the obscuration band and/or when present the fade out band, is on the coating.

Preferably the first pane of glazing material is glass.

Preferably the first pane of glazing material is glass having a soda-lime-silica composition as defined in BS EN 572-1 and BS EN 572-2 (2004).

Preferably the first pane of glazing material comprises a laminated pane.

Preferably the thickness of the obscuration band is between 5 µm and 150 µm, more preferably between 10 µm and 50 µm.

The obscuration band may not have uniform thickness and may vary in thickness.

Preferably the first adhesive layer is tinted.

Preferably the infra red reflective coating is between the first adhesive layer and the carrier ply.

Preferably the carrier ply is between the first adhesive layer and the infra red reflective coating.

Preferably the first adhesive layer comprises polyvinyl butyral (PVB).

Preferably first adhesive layer comprises a copolymer of ethylene, such as ethylene vinyl acetate (EVA).

Preferably first adhesive layer comprises polyurethane, in particular a thermoplastic polyurethane (TPU).

Preferably the laminated glazing is a vehicle glazing.

Preferably the laminated glazing is a windscreen for a vehicle, a sunroof for a vehicle, a side window for a vehicle, a rear window for a vehicle, a pane of an insulated glazing unit, a window for a building or an interior partition for a building.

Embodiments of the first aspect of the present invention that have a second adhesive layer have other preferable properties.

Preferably the second adhesive layer comprises polyvinyl butyral (PVB).

Preferably second adhesive layer comprises a copolymer of ethylene, such as ethylene vinyl acetate (EVA).

Preferably second adhesive layer comprises polyurethane, in particular a thermoplastic polyurethane (TPU).

Preferably the first adhesive layer and/or the second adhesive layer are tinted.

Embodiments of the first aspect of the present invention that have a second pane of glazing material have other preferable properties.

Preferably the second pane of glazing material has an obscuration band on a major surface thereof.

Preferably the second pane of glazing material is glass.

Preferably the second pane of glazing material has a soda-lime-silica composition as defined in BS EN 572-1 and BS EN 572-2 (2004).

Preferably the second pane of glazing material has a coating on a portion of a major surface thereof.

Preferably the thickness of the second pane of glazing material is between 1 mm and 4 mm, more preferably between 1.6 mm and 3.1 mm, most preferably between 1.8 mm and 2.2 mm.

The present invention also provides from a second aspect a method of making a laminated glazing comprising the steps:

(i) a first step of providing a first pane of glazing material having a first major surface and an opposing second major surface; there being an obscuration band on a portion of the second major surface of the first pane of glazing material;

(ii) a second step of positioning a composite ply onto the second major surface of the first pane of glazing material, the composite ply comprising a carrier ply having an infra red reflecting coating on at least a portion of a major surface thereof and a first layer of adhesive, the first layer of adhesive having a thickness between 6 μm and 100 μm, the composite ply being positioned onto the second major surface of the first pane of glazing material such that the first layer of adhesive contacts the obscuration band, and (iii) a final step of applying suitably high temperature and pressure to laminate the composite ply to the first pane of glazing material via the first adhesive layer.

The composite ply comprises in contact sequence the first layer of adhesive, the carrier ply and the infra red reflecting coating, or, in contact sequence the first layer of adhesive, the infra red reflecting coating and the carrier ply. Preferably the first adhesive layer has a thickness between 10 μm and 100 μm, preferably between 13 μm and 76 μm.

Preferably the method includes a fourth step after the second step and before the final step. The fourth step comprises positioning a second adhesive layer on the composite ply, followed by positioning a second pane of glazing material onto the second adhesive layer.

In this embodiment the final step (iii) laminates all the layers together, that is, the first pane of glazing material is connected to the second pane of glazing material via an interlayer structure comprising the first layer of adhesive, the carrier ply having an infra red reflecting coating on at least a portion of a major surface thereof, and the second adhesive layer.

When the laminated glazing comprises a second adhesive layer and a second pane of glazing material, preferably after the second adhesive layer has been positioned on the composite ply and before the second pane of glazing material has been positioned on the second adhesive layer, a film comprising an electrically actuated layer is positioned on the second adhesive layer.

When the laminated glazing comprises a second adhesive layer and a second pane of glazing material, preferably before the second adhesive layer has been positioned on the composite ply and before the second pane of glazing material has been positioned on the second adhesive layer, a film comprising an electrically actuated layer is positioned on the composite ply.

It is to be understood within the context of the present invention that when a layer A is positioned onto a layer B, this does not rule out the possibility of there being one or more other layers i.e. layers C, D, E etc in between layer A and layer B.

It is also to be understood that the adhesive layers used in the present invention are conveniently available in sheet form and such a sheet may be referred to as a ply. The layer of adhesive in sheet form prior to being incorporated in the laminated glazing is often referred to as an interlayer.

When producing a laminated glazing comprising a film comprising an electrically actuated layer, preferably the method comprises after the second step, the steps of positioning the film on the composite ply, positioning a second adhesive layer on the film and positioning a second pane of glazing material on the second adhesive layer.

Preferably prior to positioning the film on the composite ply, a third adhesive layer is positioned on the composite ply.

Preferably the film is positioned in a cut-out region in a fourth adhesive layer, and the fourth adhesive layer having the film therein is positioned on the composite ply.

Preferably the fourth adhesive layer having the film located in a cut-out region therein is positioned on the third layer, and then the second adhesive layer is positioned on the fourth adhesive layer having the film located in a cut-out region therein, followed by positioning a second pane of glazing material on the second adhesive layer.

In embodiments of the second aspect of the present invention where a laminated glazing comprising a film comprising an electrically actuated layer are made, preferably the film comprising the electrically actuated layer is an SPD film or an LCD film.

The invention will now be described with reference to the following figures (not to scale) in which, FIG. 1 is a cross sectional view of a laminated glazing having an obscuration band and a fade out band, where there is a thin adhesive layer on a smooth surface;

Figure 4:
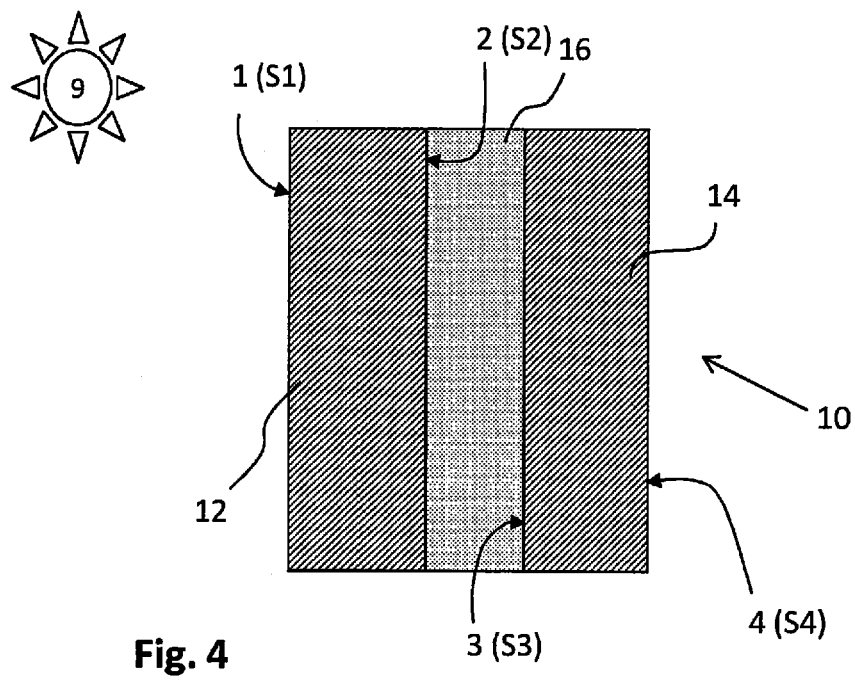
FIG. 4 is a schematic view of a laminated glazing to identify the surfaces thereof.

FIG. 4 shows a conventional laminated glazing 10 consisting of two panes of glass 12, 14 joined by an adhesive layer in the form of a sheet or ply of PVB 16. The first glass pane 12 has a first major surface 1 and an opposing second major surface 2. The second glass pane 14 has a first major surface 3 and an opposing second major surface 4. When installed in a vehicle or building, the major surface 1 faces towards the external environment (designated by the sun 9) and the major surface 4 faces the inside of the vehicle or building. Glass pane 12 is then the "outer pane" of the laminated glazing and glass pane 14 is the "inner pane" of the laminated glazing. The major surface 1 is referred to as "surface 1" or "S1" of the laminated glazing 10. The major surface 2 is referred to as "surface 2" or "S2" of the laminated glazing 10. The major surface 3 is referred to as "surface 3" or "S3" of the laminated glazing 10. The major surface 4 is referred to as "surface 4" or "S4" of the laminated glazing 10. As is conventional in the art, this nomenclature is used for the inner and outer panes of glazing material of a laminated pane, even when there is more than one ply of interlayer material in between the inner and outer panes.

Figure 5:
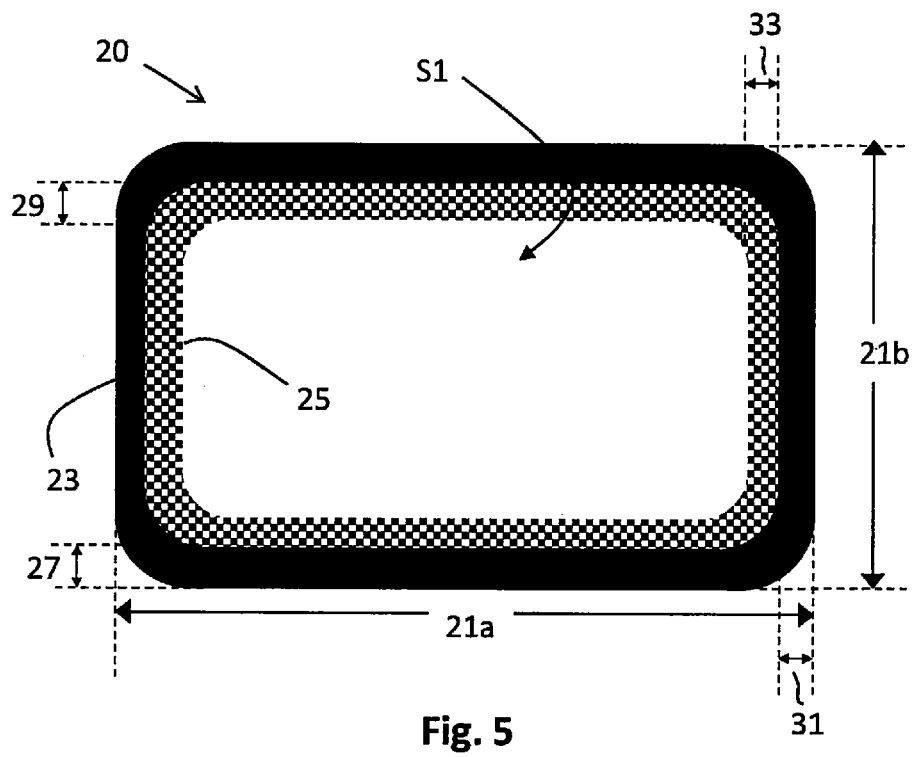
FIG. 5 is a plan view of a laminated glazing having an obscuration band on surface 2 and surface 4.
Figure 6:
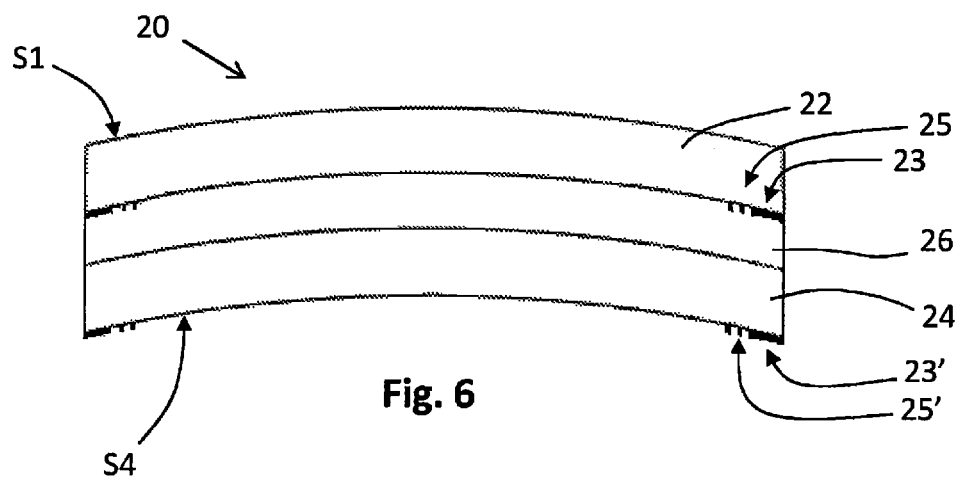
FIG. 6 is a schematic cross sectional view of the laminated glazing of FIG. 5.

FIG. 5 shows a schematic plan view of a laminated glazing 20 having an obscuration band 23 with a fade out band 25 on "surface 2" (S2) and "surface 4" (S4) of the laminated glazing. A schematic cross section of the laminated glazing 20 is shown in FIG. 6. With reference to FIGS. 5 and 6, the laminated glazing 20 comprises a first curved glass sheet 22 joined to a second curved glass sheet 24 by an adhesive interlayer 26 i.e. PVB, EVA or TPU. There is an obscuration band 23 and a fade out band 25 on "surface 2" (S2). There is also an obscuration band 23' and a fade out band 25' on "surface 4" (S4). Note that only "surface 1" (S1) and "surface 4" (S4) are labelled in FIG. 6.

In plan view, the laminated glazing 20 has a length 21a and a width 21b. The obscuration band 23 extends around the entire periphery of the glazing. The fade out band 25 extends around the entire periphery of the obscuration band.

Along the length of the laminated glazing 20 the obscuration band has a width 27 and the fade out band has a width 29. Along the width of the laminated glazing 20 the obscuration band has a width 31 and the fade out band has a width 33.

Figure 7:
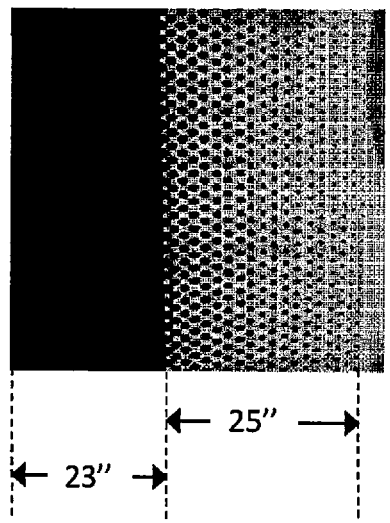
FIG. 7 shows in more detail a portion of an obscuration band and a fade out region.

FIG. 7 shows a portion 23" of the obscuration band 23 and a portion 25" of the fade out band 25 of the laminated glazing 20. As can be seen from the figure, the portion 25" consists of a number of small dots decreasing in diameter as the distance from the periphery of the obscuration band increases. The edge of the fade out band is defined by the positions of the smallest dots. Other patterns are known in the art for the design of the fade out band.

Figure 8:
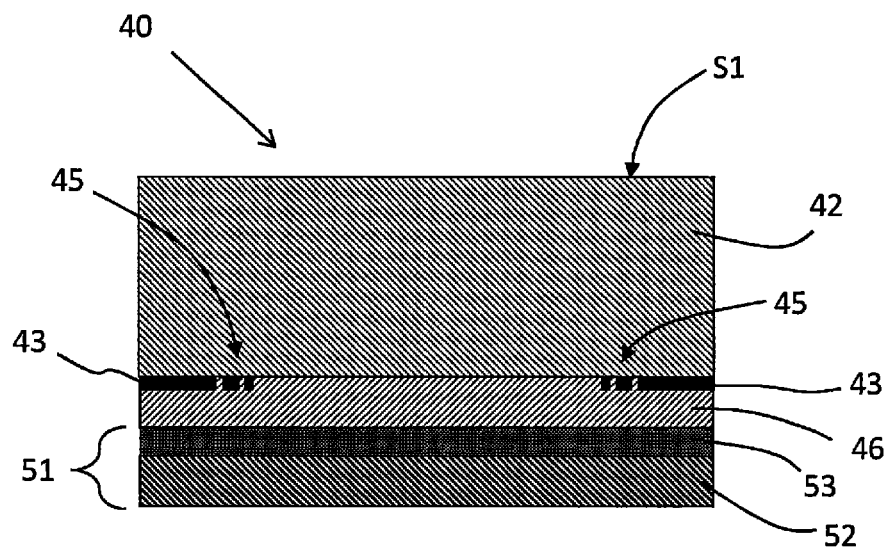
FIG. 8 is a schematic cross sectional view of a laminated glazing according to an embodiment of the present invention.

FIG. 8 shows a laminated glazing 40 in accordance with the present invention. The laminated glazing 40 comprises a pane of glass 42. Although the pane 42 is shown as being flat, it may be curved as for the glazing 20 shown in FIG. 6.

There is no obscuration band on "surface 1" (S1). On "surface 2" (S2) there is an obscuration band 43 and a fade out band 45. The obscuration band 43 and the fade out band 45 are about 12 µm thick. In contact with the second major surface of the pane 42 is a layer of PVB 46 that is 20 µm thick. The layer of PVB 46 contacts the obscuration band 43 and the fade out band 45 that extend around the periphery of the pane. The layer of PVB 46 also contacts the smooth surface of the glass pane 42 inboard of the edge of the fade out band.

Joined to the adhesive layer of PVB 46 is an infra red reflecting film 51. The infra red reflecting film 51 consists of a ply a carrier film of PET 52 having an infra red reflecting coating 53 on a surface thereof. The infra red reflecting coating 53 is between the ply of PET 52 and the adhesive layer of PVB 46. In an alternative embodiment to that shown the infra red reflecting film 51 is configured such that positions of the infra red reflecting coating 53 and carrier film of PET 52 are reversed. That is, either the ply of PET 52 or the infra red reflecting coating 53 contacts the adhesive layer 46.

In certain applications, the laminated glazing 40 may be used as shown, that is, with only one ply of glazing material, which in this example is glass but may be plastic, for example polycarbonate.

Figure 9:
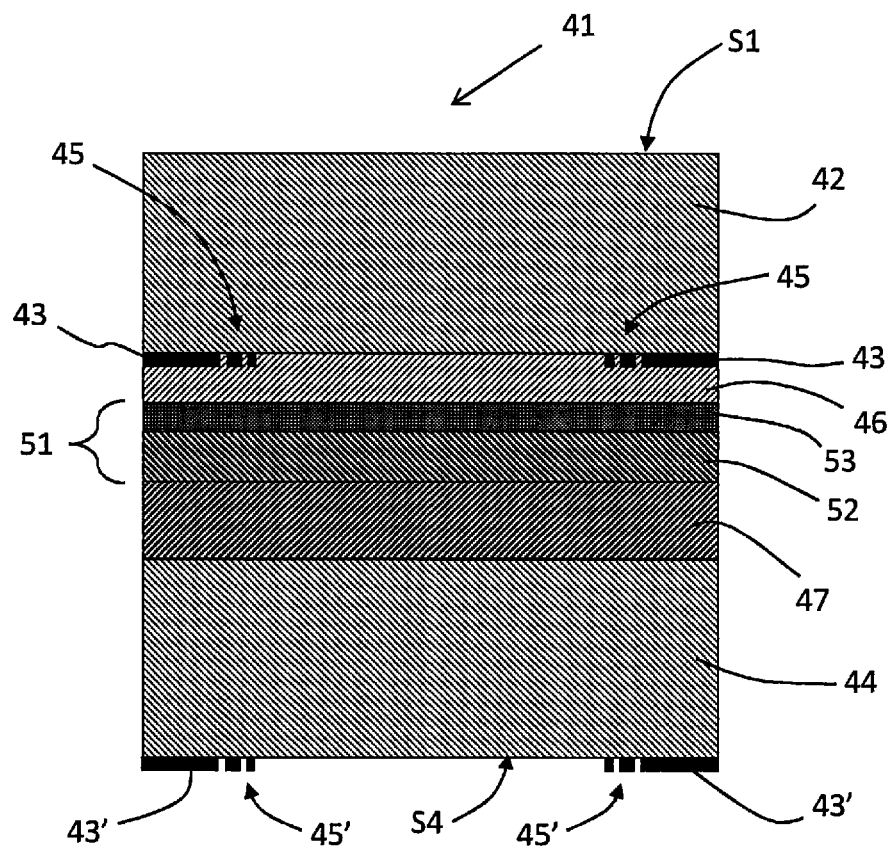
FIG. 9 is a schematic cross sectional view of a laminated glazing according to another embodiment of the present invention.

FIG. 9 shows a laminated glazing 41 according to another embodiment of the present invention. The laminated glazing 41 has a first pane of glass 42 that has a thickness of 2.1 mm. For clarity only "surface 1" (S1) and "surface 4" (S4) of the laminated glazing 41 are indicated on the figure but the other surfaces follow the naming convention described with reference to FIG. 4.

Figure 1:
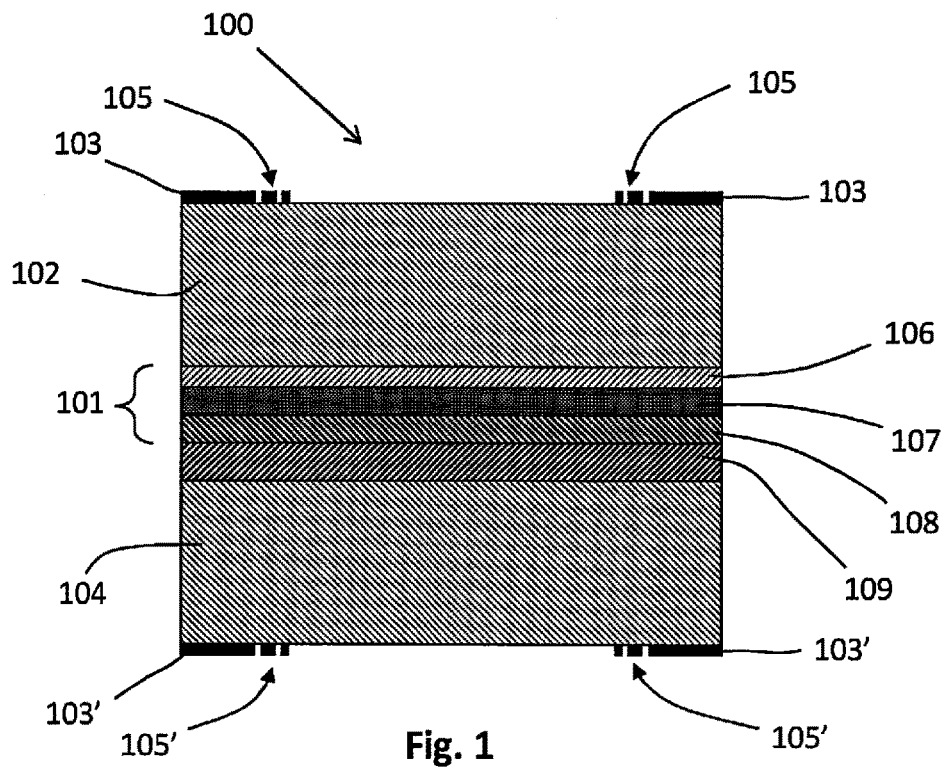
Figure 2:
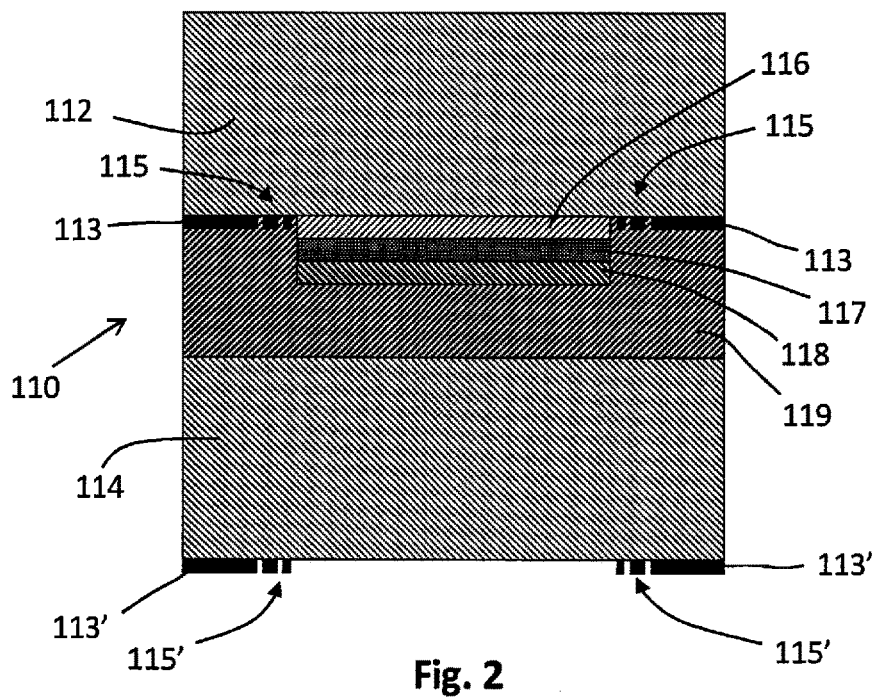
FIG. 2 is a cross sectional view of another laminated glazing having an obscuration band and a fade out band, where there is a thin adhesive layer on a smooth surface.
Figure 3:
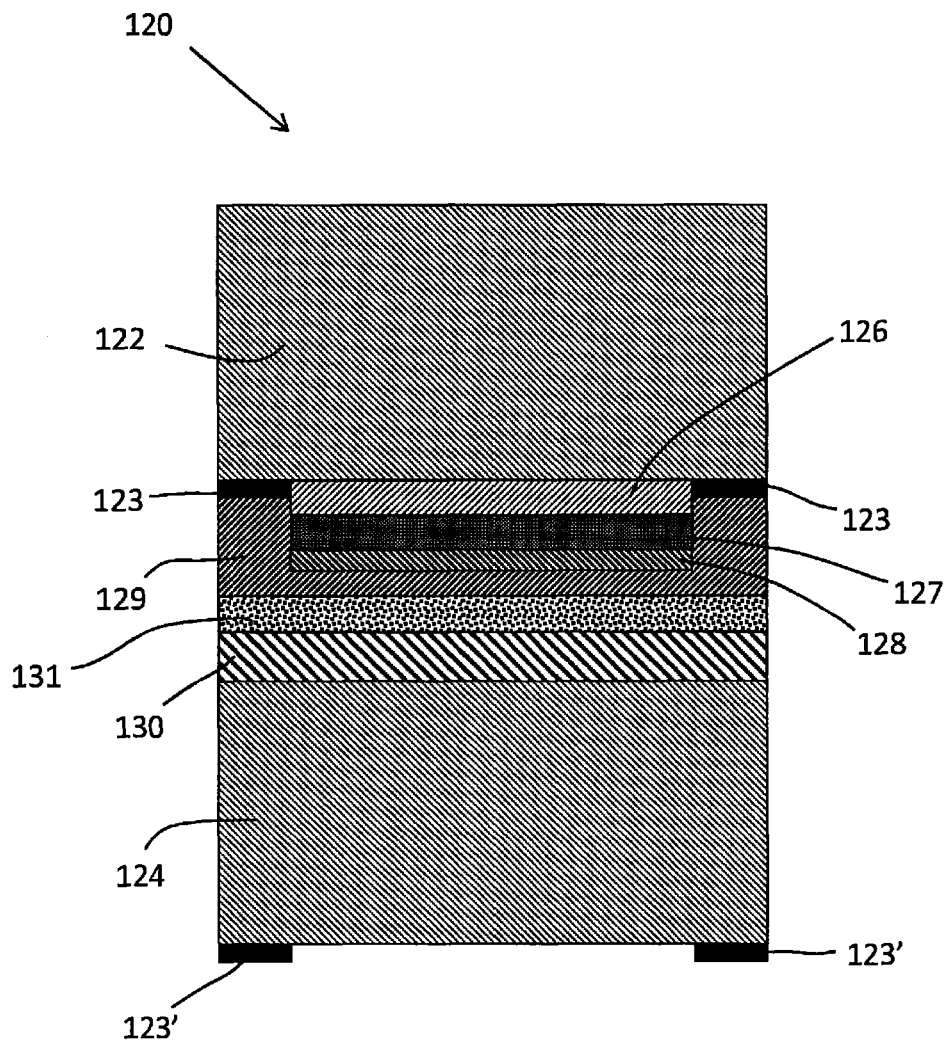
FIG. 3 is a cross sectional view of another laminated glazing having an obscuration band and a fade out band, where there is a thin adhesive layer on a smooth surface.

An obscuration band 43 and a fade out band 45 are on the inner surface of the pane of glass 42 i.e. on "surface 2" (S2). The obscuration band 43 and the fade out band 45 are about 12 µm thick. A layer of PVB 46 that is 20 µm thick is in contact with the inner surface (which is S2) of the pane of glass 42 and also in contact with the obscuration band 43 and the fade out band 45. In contact with the layer of PVB 46 is an infra red reflecting coating 53. The infra red reflecting coating 53 is in contact with a PET ply 52. Prior to being incorporated into the laminated glazing 42, the infra red reflecting coating 53 is part of a film 51 consisting of the infra red reflecting coating 53 on PET ply 52. It is preferred that prior to being incorporated into the laminated glazing, the layer of PVB 46 is deposited on the infra red reflecting coating 53. That is, conveniently the layer of PVB 46, the PET ply 52 and the infra red reflecting coating 53 are joined prior to being incorporated in the laminated glazing, being a composite ply of the type described with reference to the FIGS. 1, 2 and 3 and which may be made in accordance with WO97/03763A1.

The laminated glazing 41 has a second layer of PVB 47 in contact with the PET ply 52. The layer of PVB 47 has a thickness of 0.76 mm. Also in contact with the second layer of PVB 47 is a second pane of glass 44. The second pane of glass has a thickness of 2.1 mm. The second layer of PVB 47 is between the second pane of glass and the PET ply 52.

The second pane of glass 44 is joined to the first pane of glass 42 via an interlayer structure consisting of the first layer of PVB 46, the infra red reflecting coating 53 on the PET ply 52 and the second adhesive layer of PVB 47.

The exposed surface of glass pane 44 is "surface 4" (S4) of the laminated glazing 41. However depending upon the orientation of the laminated glazing when installed, the naming of the surfaces may change according to the convention defined with reference to FIG. 4.

On "surface 4" (S4) an obscuration band 43' and a fade out band 45' is positioned. The obscuration band 43' and the fade out band 45' are about 12 μm thick.

In a variant of the laminated glazing shown in FIG. 9, there is no fade out band 45' on "surface 4" (S4). In another variant of the laminated glazing shown in FIG. 9, there is no fade out band 45' and no obscuration band 43' on "surface 4" (S4).

In another variant there may be, in addition to or instead of, an obscuration band and/or fade out band on the surface of the pane of glass 44 opposite "surface 4" (S4), which according to FIG. 4 is "surface 3" (S3) of the laminated glazing 41.

Each of the glass panes 42, 44 is a soda-lime-silica composition having a composition as defined in BS EN 572-1 and BS EN 572-2 (2004). The iron content of the glass pane, expressed as a % by weight $Fe_2O_3$ is about 0.05% by weight $Fe_2O_3$, although other levels of $Fe_2O_3$ may be used. Other colourants known to a person skilled in the art may be present to tint each or both glass panes to a desired colour.

Figure 10:
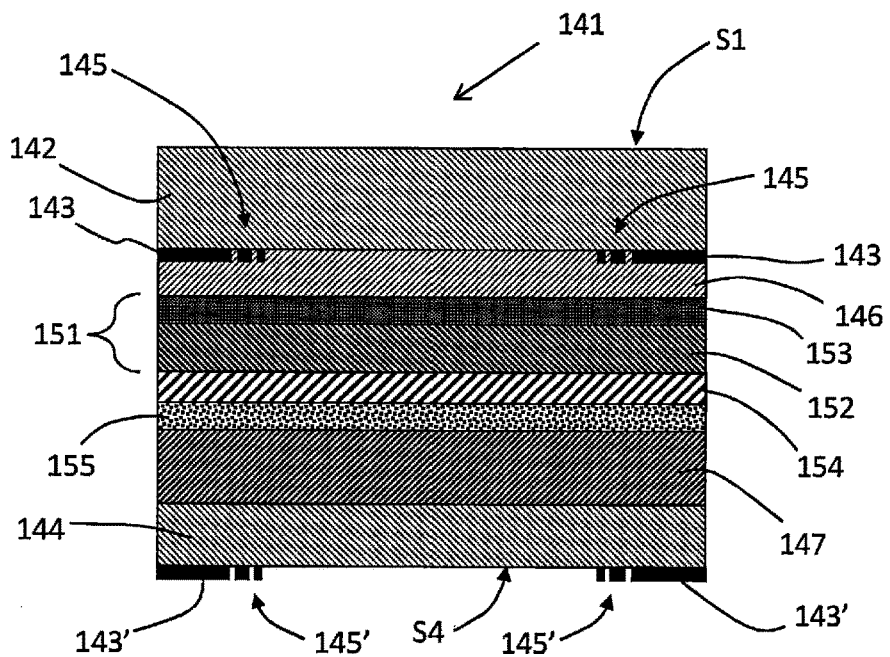
FIG. 10 is a schematic cross sectional view of a laminated glazing according to another embodiment of the present invention.

FIG. 10 shows a laminated glazing 141 in accordance with the first aspect of the present invention. Although in cross section the laminated glazing 141 is shown as being flat, it may be curved as is the case for the laminated glazing 20 shown in FIG. 6.

The laminated glazing 141 comprises a first pane of glass 142 and a second pane of glass 144 each 2.1 mm thick. The first pane of glass 142 is joined to the second pane of glass 144 via an interlayer structure that will be described in more detail hereinafter.

In use, the first pane of glass is the outer pane of the laminated glazing, see FIG. 4 for the conventional naming of the surfaces. There is no obscuration band on "surface 1" (S1). On "surface 2" (S2) there is an obscuration band 143 and a fade out band 145 around the periphery of the pane 142. The obscuration band 143 and the fade out band 145 are each about 12 μm thick. In contact with the second major surface of the first pane of glass 142 is an adhesive layer of PVB 146 that is 20 μm thick. The layer of PVB 146 contacts the obscuration band 143 and the fade out band 145. The layer of PVB 46 also contacts the smooth glass surface of glass pane 142 inboard of the edge of the fade out band.

Joined to the adhesive layer of PVB 146 is an infra red reflecting film 151. The infra red reflecting film 151 consists of a ply of a carrier film of PET 152 having an infra red reflecting coating 153 on a surface thereof. In an alternative embodiment to that shown, the infra red reflecting film 151 is configured such that the positions of the ply of PET 152 and the infra red reflecting coating 153 are reversed. That is, either the ply of PET 152 or the infra red reflecting coating 153 contacts the adhesive ply 146. It is preferable to have the infra red reflecting coating 153 in between the adhesive ply of PVB 146 and the PET ply 152 (as shown in FIG. 10). Conveniently the first adhesive layer 146 and the infra red reflecting film 151 are joined prior to being incorporated in the laminated glazing, being a composite ply of the type described with reference to the FIGS. 1, 2 and 3 and which may be made in accordance with WO97/03763A1.

The PET ply 152 is about 100 μm thick.

As shown in FIG. 10 joined to the PET ply 152 is another layer of PVB 154. The layer of PVB 154 is 0.76 mm thick.

Joined to the layer of PVB 154 is an SPD film 155. The SPD film is between and in contact with the layer of PVB 154 and another layer of PVB 147. The layer of PVB 147 is 0.76 mm thick.

The layer of PVB 147 is joined to the second pane of glass 144.

On "surface 4" (S4) there is an obscuration band 143' and a fade out band 145' extending around the periphery of the pane 144.

It is evident from the above that the interlayer structure that joins the first pane 142 to the second pane 144 consists in contact sequence of the adhesive layer 146, the infra red reflecting coating 153, the PET ply 152, the adhesive layer 154, the SPD film 155 and the adhesive layer 147.

Although in FIG. 10 the SPD film 155 is shown as extending to the edge of the laminated glazing, it is preferable to have the SPD film inboard of the edge of the laminated glazing but positioned such that when viewed in cross-section (as in FIG. 10) the edges of the SPD film are below the obscuration band 143. It is advantageous for the entire peripheral edge of the SPD film to be beneath the infra red reflecting coating 153.

Figure 11:
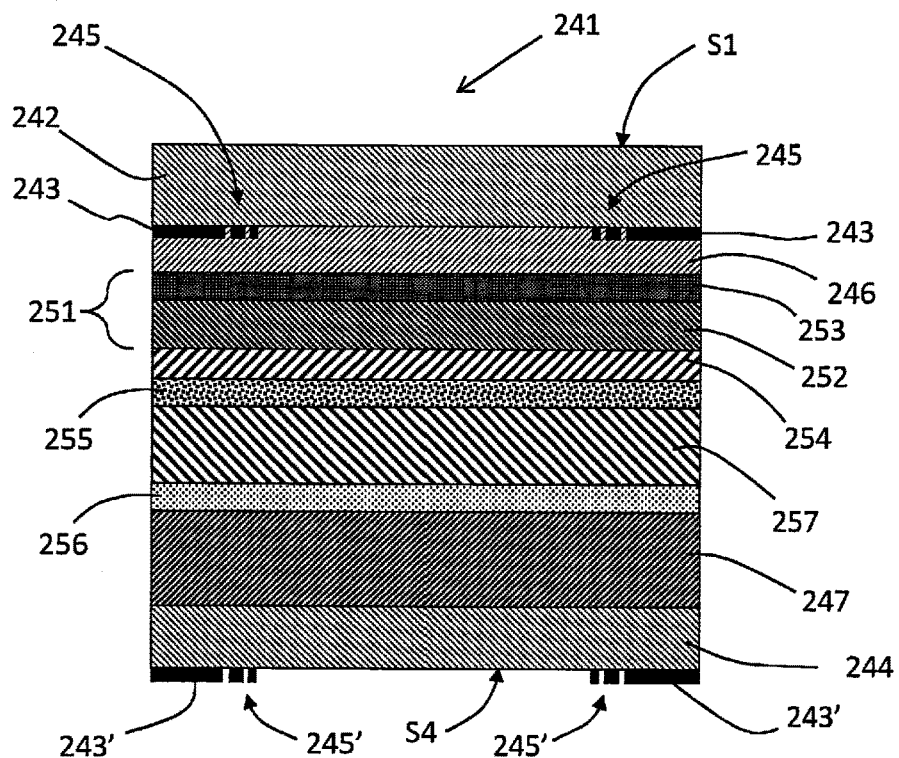
FIG. 11 is a schematic cross sectional view of a laminated glazing according to another embodiment of the present invention.

FIG. 11 shows a laminated glazing 241 according to another embodiment of the first aspect of the present invention. The laminated glazing 241 has a first pane of glass 242 joined to a second pane of glass 244 via an interlayer structure that will be described in more detail hereinafter.

The first pane of glass is low iron float glass and has a thickness of 2.1 mm. For clarity only "surface 1" (S1) and "surface 4" (S4) of the laminated glazing 241 are indicated on the figure but the other surfaces follow the naming convention described with reference to FIG. 4. Although the laminated glazing is shown as being flat in cross section, it may be curved as shown in FIG. 6.

An obscuration band 243 and a fade out band 245 are on the inner surface of the pane of glass 242 i.e. on "surface 2" (S2). The obscuration band 243 and the fade out band 245 are about 12 μm thick and extend around the periphery of the pane 242. An adhesive layer of PVB 246 that is 20 μm thick is in contact with the inner surface of the pane of glass 242 and also in contact with the obscuration band 243 and the fade out band 245. In contact with the adhesive layer of PVB 246 is an infra red reflecting coating 253. The infra red reflecting coating 253 is in contact with a PET ply 252 and is carried thereon. Prior to being incorporated into the laminated glazing 242, the infra red reflecting coating 253 is part of a film 251 consisting of the infra red reflecting coating 253 on PET ply 252. It is preferred that prior to being incorporated into the laminated glazing, the adhesive layer of PVB 246 is deposited on the infra red reflecting coating 253. That is, conveniently the layer of PVB 246, the PET ply 252 and the infra red reflecting coating 253 are joined prior to being incorporated in the laminated glazing, being a composite ply of the type described with reference to the FIGS. 1, 2 and 3 and which may be made in accordance with WO97/03763A1. In an alternative embodiment than shown, the orientation of the film 251 may be reversed such that the PET ply 252 is in contact with the adhesive layer of PVB 246.

Joined to the PET ply 252 is another layer of PVB 254. The layer of PVB 254 is 0.76 mm thick.

Joined to the layer of PVB 254 is an SPD film 255. The SPD film is between and in contact with the layer of PVB 254 and another layer of PVB 257. The layer of PVB 257 is 0.76 mm thick.

The layer of PVB 257 is joined to a plastic ply 256, such a polycarbonate or PET. The plastic ply 256 is between and in contact with the layer of PVB 257 and a layer of PVB 247. The layer of PVB 247 is 0.76 mm thick. The layer of PVB 247 is joined to the second pane of glass 244. On "surface 4" (S4) there is an obscuration band 243' and a fade out band 245' extending around the periphery of the pane 244. The second pane of glass 244 has a thickness of 2.1 mm.

It is evident from the above that the interlayer structure that joins the first pane 242 to the second pane 244 consists in contact sequence of the adhesive layer 246, the infra red reflecting coating 253, the PET ply 252, the adhesive layer 254, the SPD film 255, the adhesive layer 257, the plastic ply 256 and the adhesive layer 247.

Although in FIG. 11 the SPD film 255 is shown as extending to the edge of the laminated glazing, it is preferable to have the SPD film inboard of the edge of the laminated glazing but positioned such that the edges of the SPD film are below the obscuration band 243.

In an alternative to the embodiment shown in FIG. 11, the positions of the SPD film 255 and the plastic ply 256 may be switched. In another alternative embodiment than shown in FIG. 11, the plastic ply 256 may be replaced with a glass ply.

The exposed surface of glass pane 244 is "surface 4" (S4) of the laminated glazing 241. However depending upon the orientation of the laminated glazing when installed, the naming of the surfaces may change according to the convention defined with reference to FIG. 4.

On "surface 4" (S4) an obscuration band 243' and a fade out band 245' is positioned. The obscuration band 243' and the fade out band 245' are about 12 μm thick.

In a variant of the laminated glazing shown in FIG. 11, there is no fade out band 245' on "surface 4" (S4).

Each of the glass panes 242, 244 is a soda-lime-silica composition having a composition as defined in BS EN 572-1 and BS EN 572-2 (2004). The iron content of the glass pane, expressed as a % by weight $Fe_2O_3$ is about 0.05% by weight $Fe_2O_3$.

Figure 12:
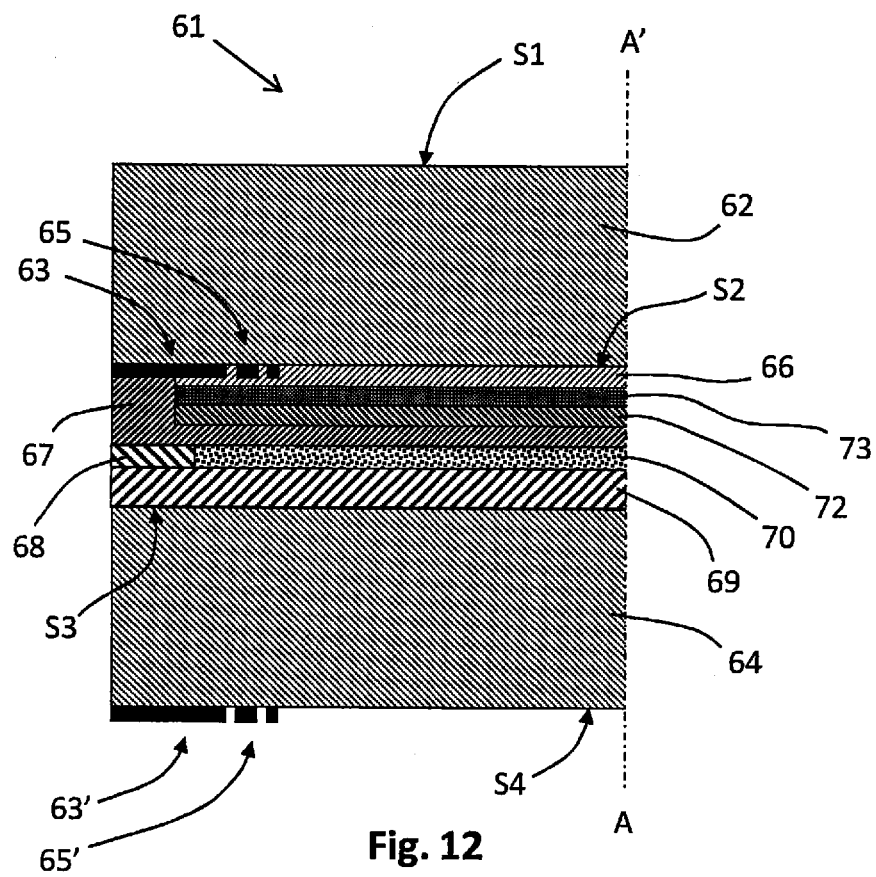
FIG. 12 is a schematic cross sectional view of part of a laminated glazing according to another embodiment of the present invention.

FIG. 12 shows a cross sectional view of a portion of another laminated glazing 61 comprising an SPD film. For clarity only half of the cross section is shown and the cross section of the laminated glazing 61 is symmetrical about the line A-A'.

The laminated glazing 61 has a first pane of glass 62 joined to second pane of glass 64 via an interlayer structure. The first pane of glass 62 has a thickness of 2.1 mm. The exposed surface of the glass ply 62 is "surface 1" (S1) of the laminated glazing. There is an obscuration band 63 and fade out band 65 on the surface of glass ply 62 opposite "surface 1" (S1) i.e. "surface 2" (S2).

There is an adhesive layer of PVB 66 that is in contact with the smooth portion of "surface 2" (S2) of the first pane of glass 62 i.e. that portion of "surface 2" (S2) that does not have the obscuration band and fade out band thereon. The layer of PVB 66 is also in contact with the fade out band 65 and the obscuration band 63. The layer of PVB 66 is 20 μm thick. The obscuration band and fade out band are about 12 μm thick.

The layer of PVB 66 does not extend to the edges of the first pane of glass 62 but instead terminates part way beneath the obscuration band 63.

In contact with the layer of PVB 66 there is an infra red reflecting coating 73. The infra red reflecting coating 73 is very thin compared to the thicknesses of the other components of the laminated glazing, with thicknesses for the infra red reflecting coating 73 in the few angstroms and few nanometers range being typical.

In contact with the infra red reflecting coating 73 is a PET ply 72. The PET ply thickness is typically between 0.01 mm and 0.5 mm, usually about 250 μm. The infra red reflecting coating 73 and the PET ply 72 are each coextensive with the layer of PVB 66. The layer of PVB 66, the infra red reflecting coating 73 and the PET ply 72 may be part of a composite ply of the type described with reference to FIGS. 1, 2 and 3. The positions of the infra red reflecting coating 73 and the PET ply 72 may be reversed.

In the example shown in FIG. 12, the assembly of layer of PVB 66 and infra red reflective coating 73 on PET ply 72 prior to being incorporated in the laminated glazing are a composite ply that may be made in accordance with WO97/03763A1.

An adhesive PVB layer 67 that is 0.76 mm thick is in contact with the PET ply 72 and the obscuration band 63. The edges of the PET ply 72 and the infra red reflecting coating 73 are protected from the external environment by the layer of PVB 67 being in contact with the obscuration band 63.

In contact with the layer of PVB 67 is a layer of PVB 68 that is 0.38 mm thick. There is a cut out region in the layer of PVB 68 in which a film 70 is positioned. The layer of PVB 68 with cut out region therein frames the film 70. The film 70 comprises a suspended particle emulsion and is often referred to as an SPD film. The cut out region is sized such that when the SPD film 70 is in the cut out region, the entire SPD film is below the infra red reflecting coating 73. Furthermore, the edge of the SPD film 70 is positioned such that when viewed through the glazing the normal to "surface 1" (S1) the obscuration band 63 covers the edge of the SPD film. The edge of the SPD film 70 may coincide with the edge of the infra red reflecting coating 73 but it is preferable for the edge of the SPD film to be beneath the obscuration band 63 and inboard of the edge of the infra red reflecting coating. This ensures that the entire SPD film is below the infra red reflecting coating and provides protection from sunlight.

Typically the edge of the PET ply 72 with the infra red reflecting coating 73 thereon is a distance x from an edge E of the laminated glazing and the associated edge of the SPD film 70 is a distance y from the edge E of the laminated glazing. Preferably y>x i.e. in a cross section of the laminated glazing the edge of the PET ply 72 with the infra red reflecting coating 73 thereon overlaps the associated edge of the SPD film 70. Preferably the distance y−x is 50 mm or less, more preferably 40 mm or less, even more preferably 30 mm or less.

Suitable electrical connections such as busbars (not shown) are in electrical communication with the SPD film 70 such that the suspended particle emulsion is switchable between the "on" and "off" states. The busbars are typically positioned underneath the obscuration band 63 so they are not visible when the glazing is installed.

The upper major surface of the SPD film 70 is in contact with and joined to the layer of PVB 67.

A layer of PVB 69 that is 0.38 mm thick is in contact with both the layer of PVB 68 and the lower major surface of the SPD film 70.

A second glass pane 64 that is 2.1 mm thick is in contact with and joined to the layer of PVB 69.

An obscuration band 63' and fade out band 65' is on the exposed surface of the ply of glass 64. This exposed surface is "surface 4" (S4) of the laminated glazing. In a variant of the laminated glazing shown in FIG. 12, there is no fade out band 65' on "surface 4" (S4).

Each of the glass panes 62, 64 is a soda-lime-silica composition having a composition as defined in BS EN 572-1 and BS EN 572-2 (2004). The iron content of the glass panes, expressed as a % by weight $Fe_2O_3$ is about 0.05% by weight $Fe_2O_3$, although it may be lower or higher.

The laminated glazing 61 was found to pass all required tests and could be exchanged for the same laminated glazing where the layer of PVB 66 was 0.76 mm thick instead of the 20 μm thick layer of PVB used in this example of the invention.

Although the laminated glazings shown in FIGS. 8, 9, 10, 11 and 12 are shown as being flat in cross section, they may be curved, for example as shown in FIG. 6.

Although the laminated glazings shown in FIGS. 8, 9 and 10, 11 and 12 have PVB layers, other adhesive layers may be used, for example EVA or TPU.

As is well known in the art, the adhesive layers of PVB, EVA, TPU etc are conveniently available in sheet form prior to being laminated. Such sheets are often referred to as interlayers.

The infra red reflecting coating shown in FIGS. 8, 9, 10, 11 and 12 may be any coating that reflects infra red energy. The infra red reflecting coating may also effect visible radiation passing through the coating or reflected therefrom. The exact nature of the infra red reflecting coating may be chosen for the specific application, for example the infra red reflecting coating may have a high visible light transmission or may be configured to have a desired visible colour in transmission and/or reflection.

The glazings 40, 41, 141, 241 and 61 may be a vehicle glazing, for example a sunroof.

Although the laminated glazings shown in FIGS. 10, 11 and 12 have an SPD film incorporated therein, the SPD film may be replaced by an LCD film.

Figure 13:
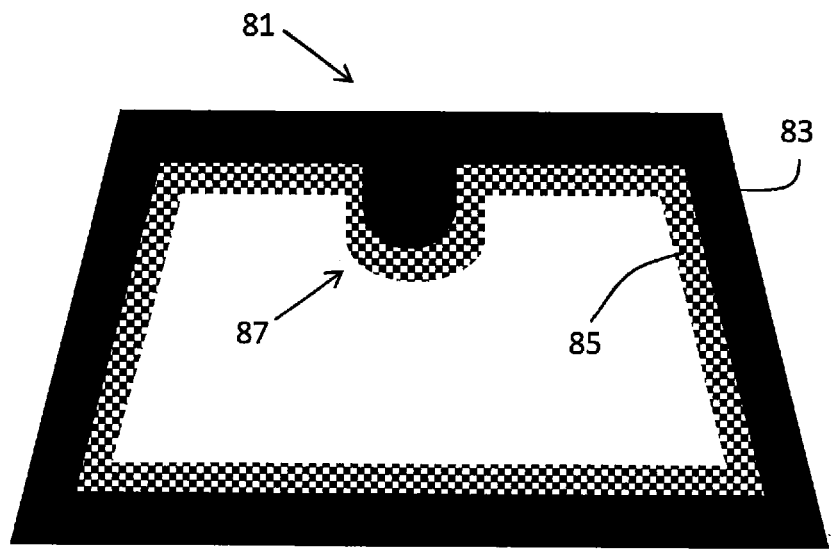
FIG. 13 is a plan view of another laminated glazing showing a different type of obscuration band and fade out band.

FIG. 13 shows a plan view of a laminated glazing 81 according to the present invention comprising first and second panes of curved glass and having an obscuration band 83 and a fade out band 85 on "surface 2" (S2). A similar obscuration band 83' and fade out band 85' is on "surface 4" (S4) of the laminated glazing 81. The laminated glazing 81 may have the construction as shown in FIG. 8, 9, 10, 11 or 12 and may be flat or curved.

The obscuration band 83 and fade out band 85 extends around the periphery of the panes of glass as shown. The width of the obscuration band 83 and fade out band 85 is substantially constant around the periphery except there is a portion 87 where the obscuration band and fade out band extend more towards the geometric centre of the major surface of the laminated glazing.

Methods of making a laminated glazing according to the first aspect of the present invention shall now be described.

The laminated glazing 41 shown in FIG. 9 may be made as follows. A first pane of glass 42 having an obscuration band 43 and a fade out band 45 on a major surface thereof is positioned horizontally on a table or the like with the obscuration band 43 and fade out band 45 facing upwards. The first pane of glass is 2.1 mm thick.

A composite ply 51' (reference numeral not indicated on FIG. 9 for clarity) consisting of an adhesive layer 46 joined to an infra red reflecting film 51 is provided. The infra red reflecting film 51 is a PET ply 52 having an infra red reflecting coating 53 on a major surface thereof. The composite ply has the infra red reflecting coating 53 between the adhesive layer 46 and the PET carrier ply 52 although in an alternative embodiment the composite ply has the PET carrier ply between the adhesive layer 46 and the infra red reflecting coating 53. The PET carrier ply 52 is about 100 μm thick and the adhesive layer 46 is 20 μm thick. The composite ply is configured to be coextensive with the first pane of glass 42.

The composite ply 51' is laid on the first pane of glass 42 such that the adhesive layer 46 contacts the obscuration band 43, the fade out band 45 and the surface of the glass pane 42 between the edges of the fade out band 45.

Next a ply of PVB 47 that is 0.76 mm thick is laid on the composite ply such that the ply of PVB 47 contacts the PET ply 52. The ply of PVB 47 is coextensive with the composite ply 51' and the first pane of glass 42.

Next a second pane of glass 44 that is 2.1 mm thick and having an obscuration band 43' and a fade out band 45' on a major surface thereof is laid on the ply of PVB 47 such the obscuration band 43' and fade out band 45' face upwards. The second pane of glass 44 is coextensive with the ply of PVB 47, the composite ply 51' and the first pane of glass 42.

The assembly of second pane of glass 44, ply of PVB 47, composite ply 51' and first pane of glass 42 are then laminated together at suitably high temperature and pressure to produce the laminated glazing 41.

Figure 14:
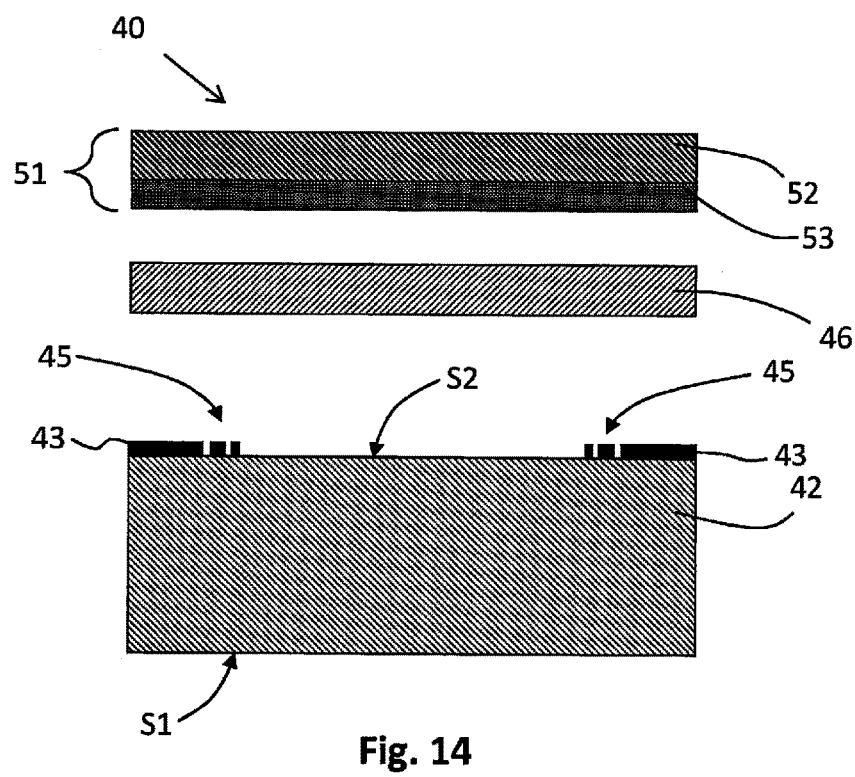
FIG. 14 is an exploded view of FIG. 8.

FIG. 14 shows an exploded cross sectional view of the laminated glazing 40 described with reference to FIG. 8. The laminated glazing 40 is manufactured as follows. First an obscuration band 43 and a fade out band 45 are deposited by screen printing a suitable ink onto one of the major surfaces of a first pane of glass 42. The ink is then fired at suitably high temperature to fire the obscuration band 43 and fade out band 45 onto the surface of the first pane of glass 42. The firing may be part of another processing step requiring the glass temperature to be raised, for example thermally toughening or bending. The bending may be gravity bending on a mould or bending using a pair of complementary moulding members.

After being fired and then subsequently cooled, the obscuration band 43 and fade out band 45 are intimately connected to the surface of the first pane of glass 42 but are slightly raised with respect to thereto. The result is that the entire surface having the obscuration band and fade out band thereon is not smooth.

The first pane of glass 42 with obscuration band 43 and fade out band 45 on a major surface thereof is laid out horizontally on a table or the like with the obscuration band and fade out band facing upwards. A ply of PVB 46 is then positioned on top. A film 51 comprising a PET ply 52 having an infra red reflecting coating 53 thereon is then laid on top of the PVB ply 46 such that the infra red reflecting coating is in between the PET ply and the PVB ply.

The assembly of first pane of glass 42, PVB ply 46 and film 51 is then subjected to suitable lamination conditions to bond the film 51 to "surface 2" (S2) of the first pane of glass 42 via the layer of PVB 46.

Figure 15:
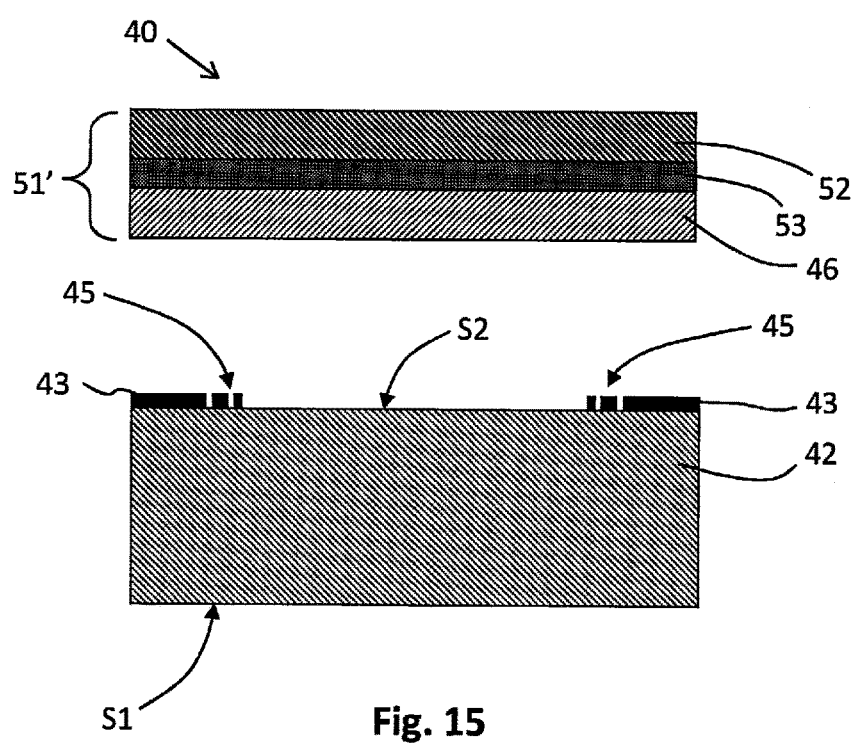
FIG. 15 is another exploded view of FIG. 8.

FIG. 15 shows an alternative method of making the laminated glazing 40. The glass sheet 42 with obscuration band 43 and fade out band 45 thereon is made in the same manner as described with reference to FIG. 14. However in this example instead of a separate ply of PVB 46, a composite ply 51' is used that has an adhesive layer of PVB 46, an infra red reflecting coating 53 and a PET ply 52. Such a composite ply is described in WO97/03763A1 and may be made by the methods described therein. For example for the particular composite ply 51' used to manufacture the laminated glazing 40, initially a PET ply 52 is coated with the infra red reflecting coating 53, and then the PVB adhesive layer 46 is applied to the infra red reflecting coating. In the example shown the PVB layer 46 is in direct contact with the infra red reflecting coating 53 but there may be other layers in between the infra red reflecting coating and the PVB layer.

The pane of glass 42 with obscuration band 43 and fade out band 45 thereon is then laid out horizontally on a table or the like with the obscuration band and fade out band facing upwards. The composite ply 51' is laid on the glass pane 42 such that the PVB layer 46 contacts the glass surface, the obscuration band 43 and the fade out band 45. The assembly of pane of glass 42 and composite ply 51' is then subject to a suitable lamination process to bond the composite ply 51' to the pane of glass via the PVB layer 46.

Although the laminated glazing 40 is shown having the PVB layer 46, the infra red reflecting coating 53 and the PET ply 52 all extending to the edge of the pane of glass, all or any of the edges of the PVB layer 46, the infra red reflecting coating 53 and the PET ply 52 may extend to beneath the obscuration band 43 but not to the edge of the glass sheet. This can be achieved by using a film 51 or composite ply 51' that has a surface area that is smaller than the major surface area of the pane of glass.

Figure 16:
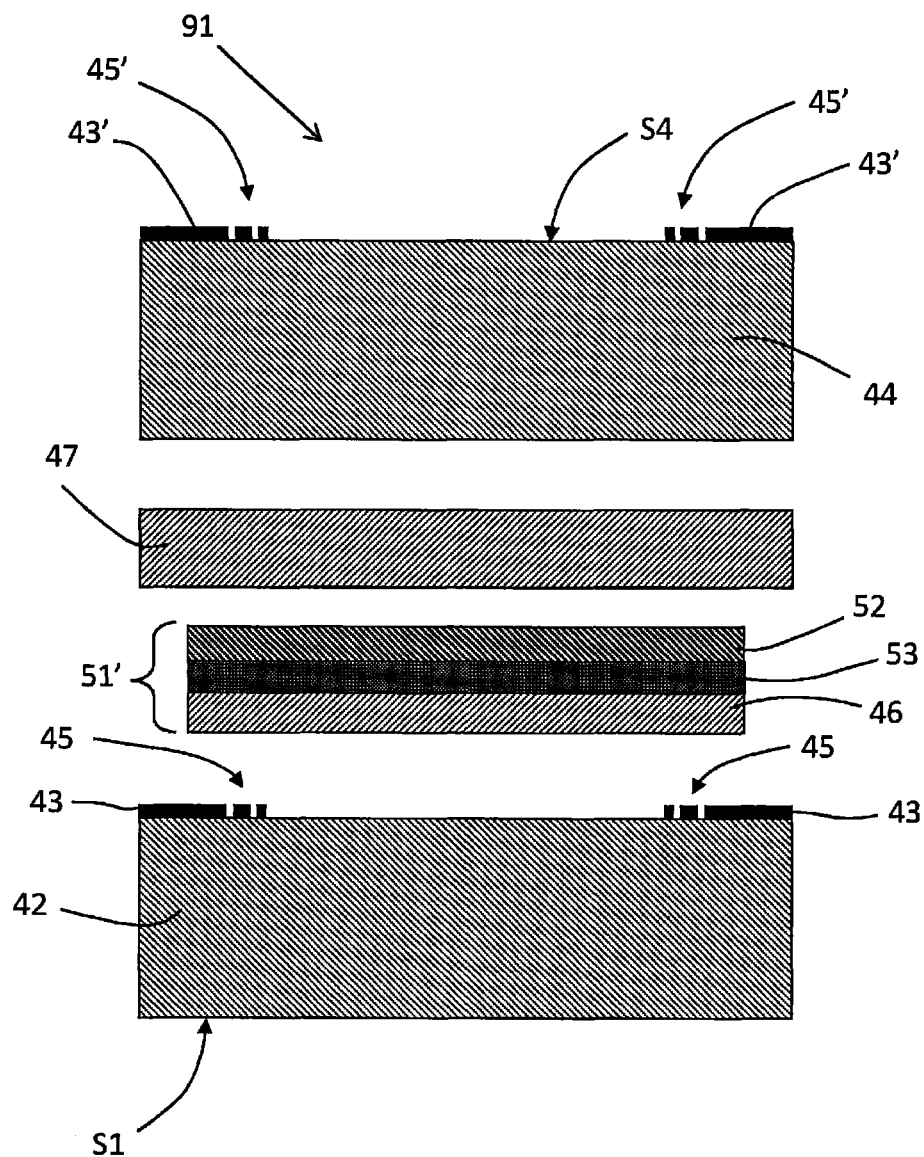
FIG. 16 is an exploded view of a laminated glazing according to the present invention.

FIG. 16 shows an exploded cross sectional view of a laminated glazing 91. The laminated glazing 91 is similar to the laminated glazing 41 described with reference to FIG. 9 except that in the laminated glazing 41 the PVB layer 46, the infra red reflecting coating 53 and the PET ply 52 extend to the edge of the glass sheet 42. For the laminated glazing 91 the equivalent parts do not extend to the edge of the glass sheet 42. Instead the edge of the PVB layer 46, the infra red reflecting coating 53 and the PET ply 52 extend to within the region of the obscuration band 43 but don't extend to the edge of the glass pane 42.

The laminated glazing 91 is made as follows. The glass sheet 42 having the obscuration band 43 and fade out band 45 is made in the same manner as described in relation to the FIGS. 14 and 15.

The pane of glass 42 having the obscuration band 43 and fade out band 45 thereon is laid out horizontally on a table or the like with the obscuration band 43 and fade out band 45 facing upwards. Next composite ply 51' is provided, the composite ply 51' having a layer of PVB 46 on one side, a PET ply 52 on the other side and an infra red reflecting coating 53 in between the PVB layer 46 and the PET ply 52. The composite ply 51' is the same as described with reference to FIG. 15.

The composite ply 51' is laid on top of the pane of glass 42 such that the PVB layer 46 contacts the glass surface, the fade out band 45 and the obscuration band 43. The composite ply 51' is sized such that the edge of the composite ply 51' lies within the obscuration band and not at the edge of the glass sheet 42.

Next a ply of PVB 47 is laid on top of the composite ply 51'. The ply of PVB is sized to be coextensive with the pane of glass 42. The thickness of the ply of PVB 47 is 0.76 mm. Since the dimensions of the composite ply 51' are smaller than the dimensions of the pane of glass 42, the ply of PVB 47 contacts the PET ply 52 and the obscuration band 43. Finally a second pane of glass 44 having an obscuration band 43' and a fade out band 45' is placed on the PVB ply 47. The obscuration band 43' and the fade out band 45' are facing upwards such that they are on an exposed surface (in this case "surface 4" (S4)) of the resulting laminated glazing, although the obscuration band 43' and the fade out band 45' may be located on the unexposed surface of the glass sheet 44, i.e. on "surface 3" (S3) of the resulting laminated glazing.

The assembly of pane of glass 42, composite ply 51', PVB ply 47 and pane of glass 44 is then subjected to suitable lamination conditions to produce the laminated glazing 91. The pane of glass 42 becomes joined to the pane of glass 44 via an interlayer structure consisting of the composite ply 51' and the layer of PVB 47.

Figure 17:
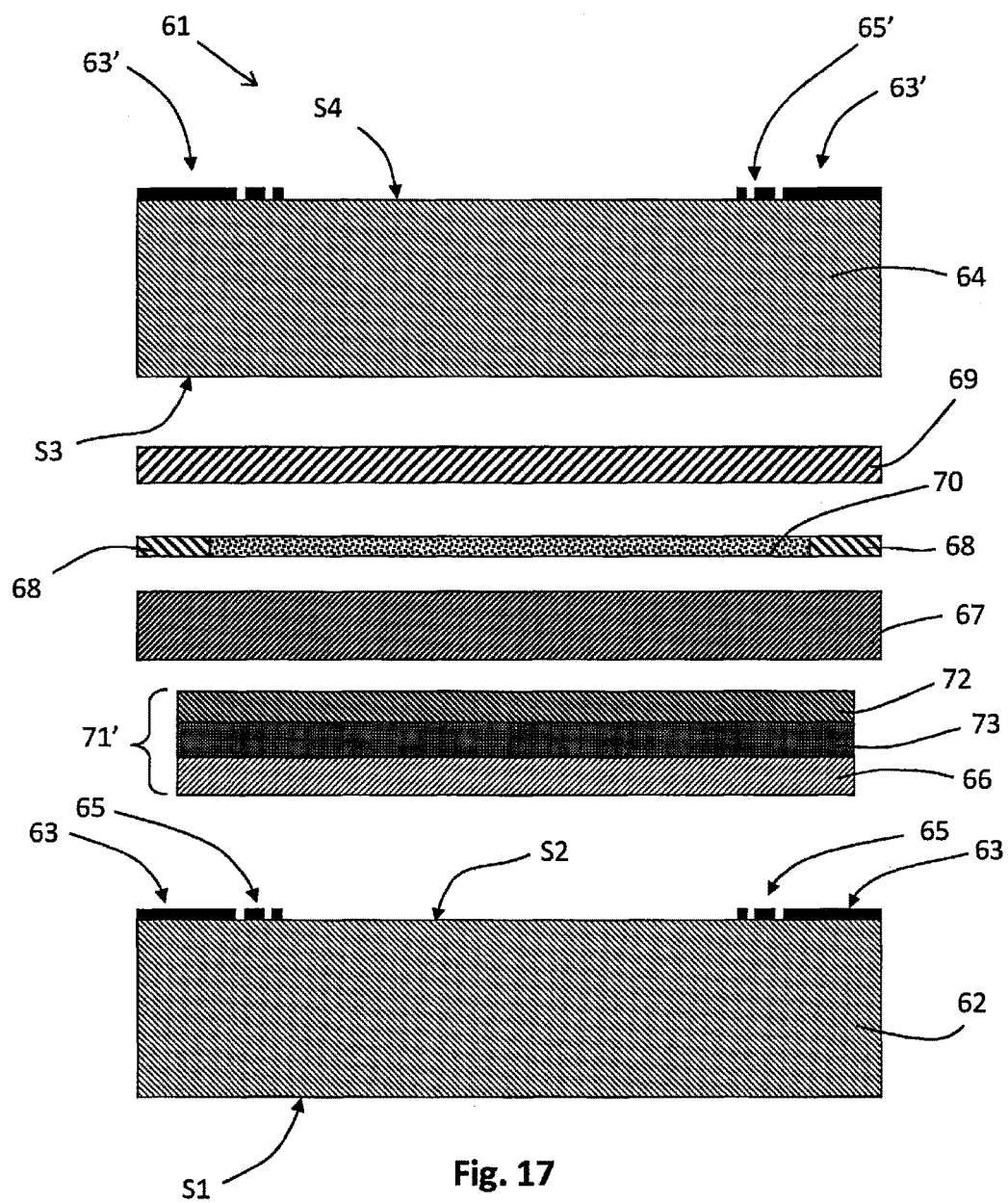
FIG. 17 is an exploded view of the laminated glazing shown in FIG. 12.

FIG. 17 shows an exploded cross sectional view of the laminated glazing 61, a portion of which is shown in FIG. 12 and described with reference thereto.

The laminated glazing 61 is manufactured as follows. First an obscuration band 63 and a fade out band 65 are deposited onto one of the major surfaces of a first pane of glass 62 by a suitable process such as screen printing a suitable ink. The ink is then fired at suitably high temperature to fire the obscuration band 63 and fade out band 65 onto the surface of the first pane of glass 62. The firing may be part of another processing step requiring the glass temperature to be raised, for example thermally toughening or bending. The bending may be gravity bending on a mould or bending using a pair of complementary moulding members.

After being fired and then subsequently cooled to ambient conditions, the obscuration band 63 and fade out band 65 are intimately connected to the surface of the first pane of glass 62 but are slightly raised with respect to thereto. The result is that the entire surface having the obscuration band and fade out band thereon is not smooth.

The first pane of glass 62 having the obscuration band 63 and fade out band 65 on a major surface thereof is laid out horizontally on a table or the like with the obscuration band 63 and fade out band 65 facing upwards.

Next composite ply 71' is provided. The composite ply 71' consists of a layer of PVB 66 on one side, a PET ply 72 on the other side and an infra red reflecting coating 73 in between the layer of PVB 66 and the PET ply 72. The layer of PVB 66 is 20 μm thick. The PET ply 72 is 50 μm thick and the infra red reflecting coating 73 is 100 nm thick. The layer of PVB 66, the PET ply 72 and the infrared reflecting coating 73 are each coextensive with each other.

The composite ply 71' is laid on top of the pane of glass 62 such that the PVB layer 66 contacts the glass surface, the fade out band 65 and the obscuration band 63. The composite ply 71' is sized such that the edge of the composite ply 71' lies within the obscuration band and not at the edge of the pane of glass 62.

Next a ply of PVB 67 is laid on top of the composite ply 71'. The ply of PVB 67 is sized to be coextensive with the pane of glass 62. Since the dimensions of the composite ply 71' are smaller than the dimensions of the pane of glass 62 the ply of PVB 67 contacts the upper surface of the composite ply (which corresponds to the surface of PET ply 72) and the obscuration band 63. The PVB ply 67 is 0.76 mm thick.

Next a ply of PVB 68 that is 0.38 mm thick is laid on top of the ply of PVB 67. The ply of PVB 68 has a cut-out region therein. Preferably the cut-out region extends from the top surface to the bottom surface of the ply of PVB 68. Next an SPD film 70 is positioned in the cut-out region such that the SPD film 70 is framed by the ply of PVB 68.

Next a ply of PVB 69 that is 0.76 mm thick is placed on top of the PVB ply 68 having the SPD film located in a cut-out region therein. Consequently the ply of PVB 69 is also placed on top of the SPD film 70.

Finally a second pane of glass 64 having an obscuration band 63' and a fade out band 65' thereon is laid on top of PVB ply 69, such that the obscuration band 63' and fade out band 65' are facing upwards.

The assembly of first pane of glass 62, composite ply 71', PVB ply 67, PVB ply 68 having SPD film 70 located in a cut-out region therein, PVB ply 69 and second pane of glass 64 is then subjected to suitable lamination conditions to produce the laminated glazing 61. The first pane of glass 62 is joined to the second pane of glass 64 via an interlayer structure consisting of composite ply 71', PVB ply 67, PVB ply 68 having SPD film 70 located in a cut-out region therein and PVB ply 69.

In an alternative to the above method of making the laminated glazing 61, the composite ply 71' has the positions of the PET ply 72 and infrared reflecting coating 73 reversed, such that the PET ply 72 is between the adhesive layer 66 and the infrared reflecting coating 73. Otherwise the process steps are the same.

It will be readily apparent that it is possible to make the laminated glazing 61 by first positioning the pane of glass 64 on a table, and then placing the PVB ply 69 on the glass pane 64 i.e. on "surface 3" (S3). Next the PVB ply 68 having a cut out region therein can be positioned on the PVB ply 69. The SPD film 70 can then be located in the cut out region in the PVB ply 68. Next the PVB ply 67 can be placed on the PVB ply 68 having the SPD film 70 located in a cut out region therein. Next the composite ply 51' can be placed on the PVB ply 67. Finally the pane of glass 62 can be placed on the composite ply 71'. This assembly can then be subjected to suitable pressure and temperature to produce the laminated glazing 61.

The present invention has the particular advantage that laminated glazings may be manufactured comprising two panes of glazing material, an infra red reflecting coating on a carrier ply and an obscuration band on an inner facing surface of one of the pane of glazing material, such that there is reduced optical distortion. This is particularly important for a laminated glazing comprising an SPD film because the SPD film has a low light transmission state that makes the optical distortion more readily apparent to an observer, particularly in reflection.

Although the examples described herein have at most four adhesive layers, it will be readily apparent that there may be more than four adhesive layers. Furthermore, when the laminated glazing has a first pane of glazing material and a second pane of glazing material, it will be readily apparent that there may be additional (i.e. one or more) plastic layers or panes of glazing material i.e. glass, in between the first pane of glazing material and the second pane of glazing material.

Although an SPD film has been used in certain examples, the SPD film may be replaced by other electrically actuated films such as liquid crystal display films.

Laminated glazings according to the first aspect of the present invention find particular application as windows for vehicles or buildings. When used as a vehicle window, the window may be a windscreen, rear window, side window or sunroof.

The invention claimed is:

1. A laminated glazing comprising a first pane of glazing material having a first major surface and an opposing second major surface, there being an obscuration band on the second major surface extending around a portion of the periphery of the first pane such that the second major surface is not smooth, a first adhesive layer having a thickness of between 6 µm and 100 µm, and a carrier ply carrying an infra red reflecting coating, wherein the first adhesive layer is between the first pane of glazing material and the carrier ply and the first adhesive layer contacts a portion of the second major surface and a portion of the obscuration band, the laminated glazing further comprising a second pane of glazing material and a second adhesive layer, wherein the second adhesive layer is in contact with the second pane of glazing material and the infra red reflecting coating is between the first adhesive layer and the second adhesive layer, the laminated glazing further comprising a film comprising an electrically actuated layer, wherein the carrier ply is between the first adhesive layer and the film, and further wherein the film is between the second adhesive layer and the carrier ply, further wherein the film is located in a cut out region in an adhesive layer that is between the second adhesive layer and the carrier ply.

2. The laminated glazing according to claim 1, wherein the obscuration band comprises a fade out band and the first adhesive layer contacts at least a portion of the fade out band.

3. The laminated glazing according to claim 2, wherein the thickness of the fade out band is between 1 µm and 150 µm.

4. The laminated glazing according to claim 1, wherein the thickness of the obscuration band is between 1 µm and 150 µm.

5. The laminated glazing according to claim 1, wherein the first adhesive layer has a thickness between 10 µm and 100 µm.

6. The laminated glazing according to claim 1, wherein the second adhesive layer has a thickness between 0.1 mm and 2 mm.

7. The laminated glazing according to claim 1, wherein the second adhesive layer comprises polyvinyl butyral, a copolymer of ethylene or polyurethane.

8. The laminated glazing according to claim 1, wherein the laminated glazing comprises a third adhesive layer and the film is between the second adhesive layer and the third adhesive layer.

9. The laminated glazing according to claim 8, wherein the film is located in a cut out region in a fourth adhesive layer, and the fourth adhesive layer is between the second adhesive layer and the third adhesive layer.

10. The laminated glazing according to claim 1, wherein at least a portion of an edge of the film is in registration with the obscuration band.

11. The laminated glazing according to claim 1, wherein the film comprising the electrically actuated layer comprises an SPD film or an LCD film.

12. The laminated glazing according to claim 1, wherein the visible light transmission calculated according to BS EN410 through a portion of the laminated glazing not covered with the obscuration band is at least 70% or is less than 70%.

13. The laminated glazing according to claim 1 wherein the carrier ply is a plastic ply.

14. The laminated glazing according to claim 1 wherein the first adhesive layer comprises polyvinyl butyral.

15. The laminated glazing according to claim 1, being a vehicle glazing.

16. A method of making a laminated glazing comprising the steps:
   (i) a first step of providing a first pane of glazing material having a first major surface and an opposing second major surface; there being an obscuration band on a portion of the second major surface of the first pane of glazing material;
   (ii) a second step of positioning a composite ply onto the second major surface of the first pane of glazing material, the composite ply comprising a carrier ply having an infra red reflecting coating on at least a portion of a major surface thereof and a first layer of adhesive, the first layer of adhesive having a thickness between 6 μm and 100 μm, the composite ply being positioned onto the second major surface of the first pane of glazing material such that the first layer of adhesive contacts the obscuration band,
   (iii) a third step comprising positioning a second pane of glazing material and a second adhesive layer such that the second adhesive layer is in contact with the second pane of glazing material and the infra red reflecting coating is between the first adhesive layer and the second adhesive layer, and positioning a film comprising an electrically actuated layer such that the carrier ply is between the first adhesive layer and the film and the film is between the second adhesive layer and the carrier ply, wherein the film is located in a cut out region in an adhesive layer that is between the second adhesive layer and the carrier ply, and
   (iv) a fourth step of applying suitably high temperature and pressure to laminate the composite ply to the first pane of glazing material via the first adhesive layer and to the second pane of glazing material via the second adhesive layer.

17. A method according to claim 16, wherein the film comprising the electrically actuated layer is an SPD film or an LCD film.

* * * * *